(12) United States Patent
Pullen et al.

(10) Patent No.: US 12,736,107 B2
(45) Date of Patent: Sep. 15, 2026

(54) FLYWHEEL

(71) Applicant: LEVISTOR LTD, London (GB)

(72) Inventors: Keith Pullen, London (GB); Matthew Journee, London (GB); Ivan Roitch, London (GB)

(73) Assignee: LEVISTOR LTD, London (GB)

( * ) Notice: Subject to any disclaimer, the term of this patent is extended or adjusted under 35 U.S.C. 154(b) by 0 days.

(21) Appl. No.: 18/840,568

(22) PCT Filed: Feb. 23, 2023

(86) PCT No.: PCT/GB2023/050414
§ 371 (c)(1),
(2) Date: Aug. 22, 2024

(87) PCT Pub. No.: WO2023/161639
PCT Pub. Date: Aug. 31, 2023

(65) Prior Publication Data

US 2025/0163994 A1 May 22, 2025

(30) Foreign Application Priority Data

Feb. 23, 2022 (GB) ...................................... 2202497

(51) Int. Cl.
*F16F 15/315* (2006.01)
*F16B 35/04* (2006.01)

(52) U.S. Cl.
CPC ........ *F16F 15/3153* (2013.01); *F16B 35/041* (2013.01); *F16F 2230/40* (2013.01)

(58) Field of Classification Search
CPC .... F16F 15/3153; F16F 15/30; F16F 2230/40; F16B 35/041
See application file for complete search history.

(56) References Cited

U.S. PATENT DOCUMENTS 4,186,623 A 2/1980 Friedericy et al.
4,286,475 A 9/1981 Friedericy et al.
(Continued)

FOREIGN PATENT DOCUMENTS

DE 102013208856 A1 11/2014
EP 0155327 B1 1/1988
(Continued)

OTHER PUBLICATIONS

Written Opinion of the International Searching Authority dated Jun. 27, 2023, International Application No. PCT/ GB2023/050414 filed Feb. 23, 2023.

*Primary Examiner* — Thomas C Diaz
(74) *Attorney, Agent, or Firm* — Jacob M. Ward; Ward Law Office LLC

(57) ABSTRACT

A flywheel (1100) comprising a plurality of discs (1102) arranged in a stack (1104), including at least first and second end discs at either end of the stack (1104), each of the plurality of discs (1102) including a plurality of disc apertures therethrough, first and second plate members (1106) disposed at opposing ends of the stack (1104), one or both of the first and second plate members (1106) including a plurality of plate apertures (1106*a*) therethrough for alignment with a corresponding series of disc apertures through the stack (1104), in which one or both of the plate members (1106) includes one or more recesses (1106*c*) which are disposed on a disc-facing side thereof and positioned adjacent to one or more of the plurality of plate apertures (1106*a*), and connection means (1114) for clamping the first and second plate members (1106) together about the stack of discs, the connection means (1114) extending through each of the plurality of disc apertures, in which a spacer or space-filling means (1138) is provided between the or each connection means (1114) and the respective disc apertures for supporting the connection means (1114), the spacer or
(Continued)

space-filling means (1138) extending from a position within the stack (1104) into the one or more recesses (1106*c*) of one or both of the plate members (1106).

17 Claims, 13 Drawing Sheets

(56) References Cited

U.S. PATENT DOCUMENTS

| | | | | | |
|---|---|---|---|---|---|
| 4,538,079 | A * | 8/1985 | Nakayama | ............. | H02K 7/025<br>310/74 |
| 7,267,028 | B2 | 9/2007 | Gabrys | | |
| 10,138,980 | B2 | 11/2018 | Sanders et al. | | |
| 2013/0330145 | A1 | 12/2013 | Cloud | | |
| 2014/0167533 | A1 | 6/2014 | Andrews et al. | | |
| 2016/0178031 | A1 * | 6/2016 | Pullen | ..................... | F16F 15/30<br>74/572.11 |

FOREIGN PATENT DOCUMENTS

| | | | | | |
|---|---|---|---|---|---|
| EP | 2759043 | B1 | | 2/2020 | |
| GB | 520513 | A | * | 4/1940 | .............. F16F 15/30 |
| GB | 2494783 | A | | 3/2013 | |
| JP | S58215948 | A | | 12/1983 | |
| JP | S58215950 | A | | 12/1983 | |
| JP | H03222640 | A | | 10/1991 | |
| JP | 2005102460 | A | * | 4/2005 | ............... H02K 1/28 |

* cited by examiner

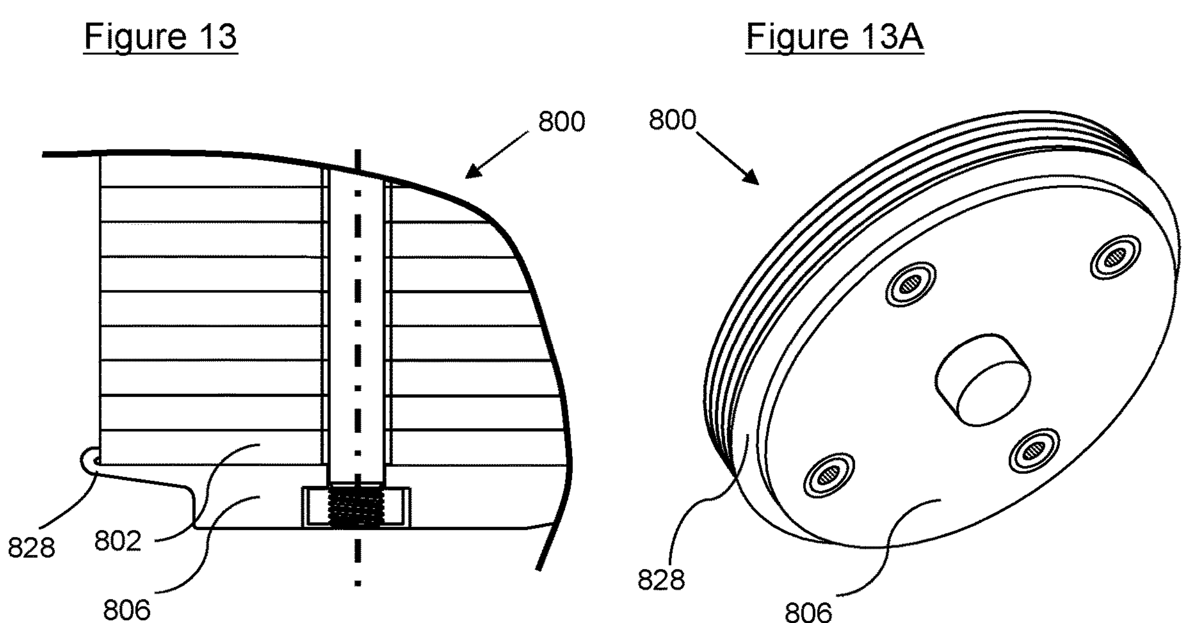
Figure 13
Figure 13A
800
800
828
802
806
828
806
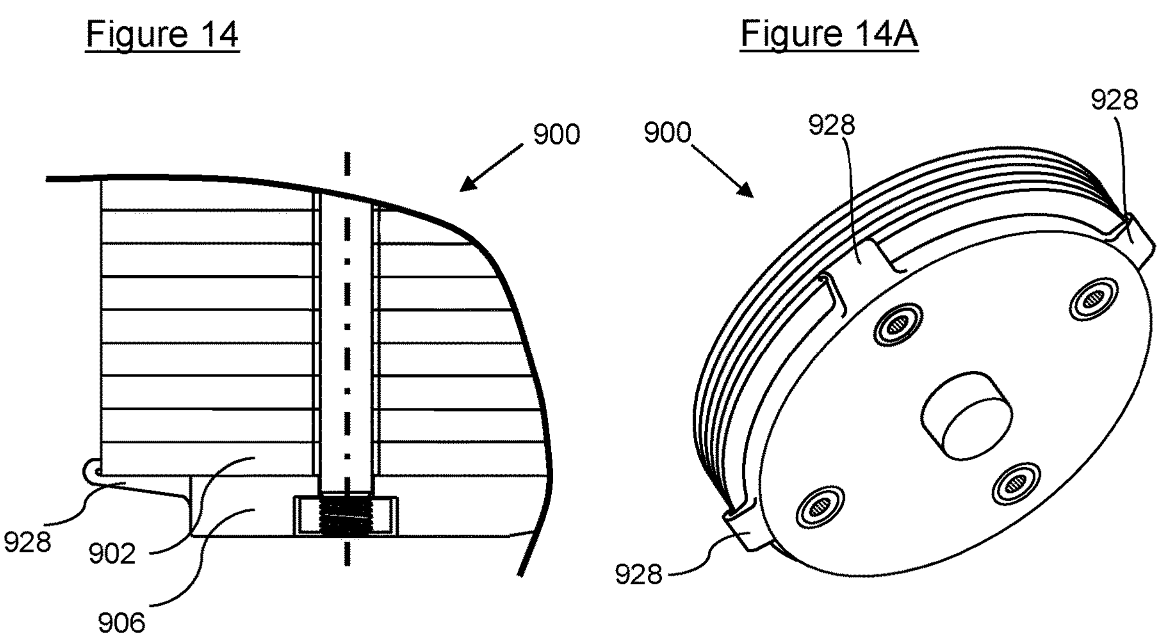
Figure 14
Figure 14A
900
900
928
928
928
902
906
928

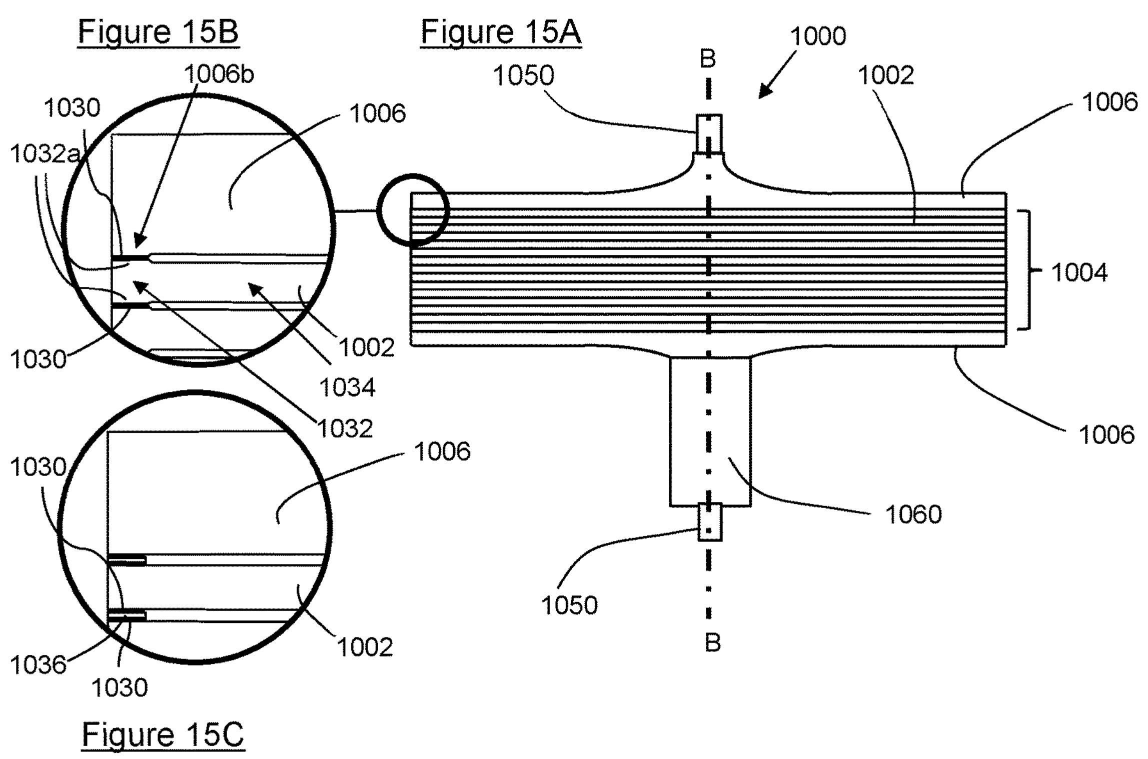
Figure 15B
Figure 15A
1000
B
1050
1002
1006
1006b
1030
1006
1032a
1004
1030
1002
1034
1006
1032
1006
1030
1060
1050
1002
1036
1030
B
Figure 15C
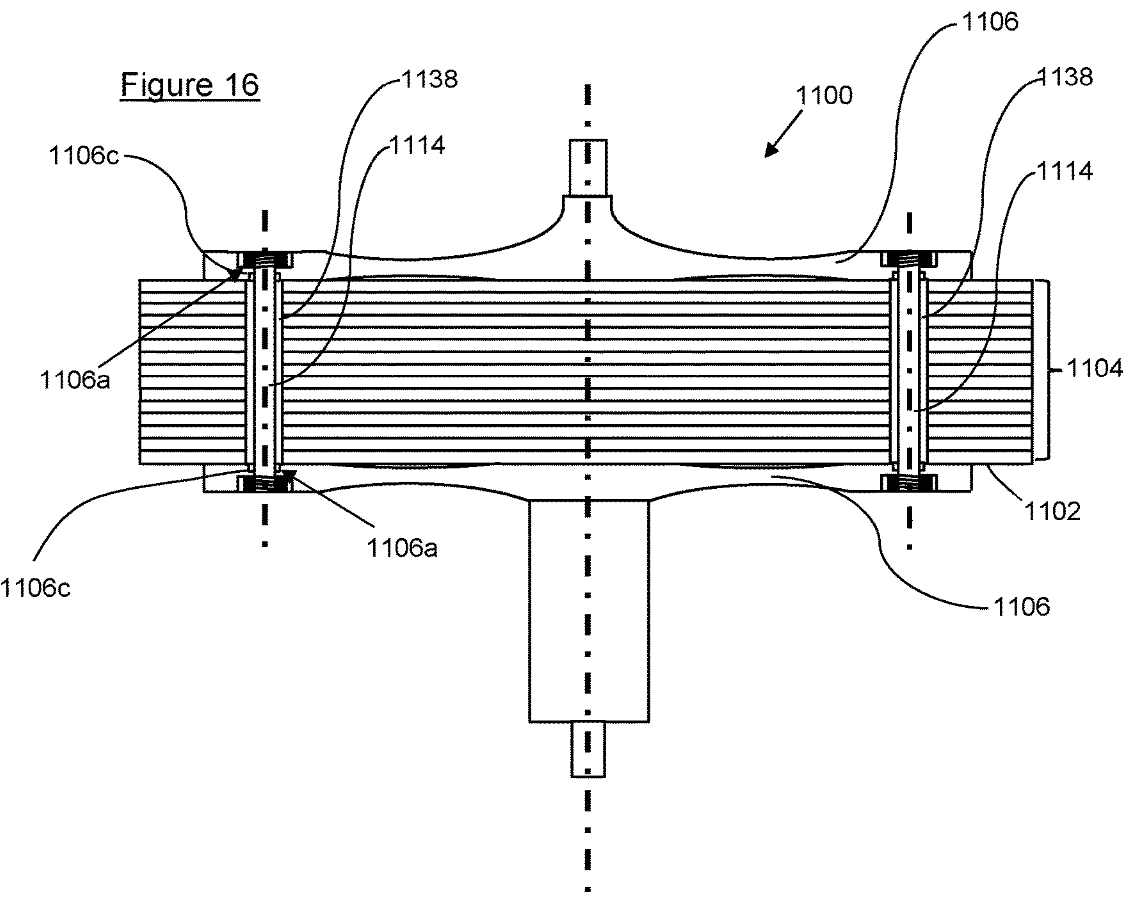
Figure 16
1106
1138
1100
1138
1114
1106c
1114
1106a
1104
1102
1106c
1106a
1106

1138
1138a
1138b
1140

1214
1248
1246b
1246a
1244
1206c

1138'
1142
1140
1138b 1248
1200
1202
1214
1248
1204
1244
1244

FLYWHEEL

CROSS-REFERENCE TO RELATED APPLICATIONS

This application claims the benefit of PCT Application No. PCT/GB2023/050414, filed on Feb. 23, 2023, which claims the benefit of Great Britian Application No. GB 2202497.0, filed on Feb. 23, 2022. The entire disclosures of the above applications are incorporated herein by reference.

The present invention relates to a flywheel, particularly but not exclusively for use in energy storage and/or deployment.

BACKGROUND TO THE INVENTION

A flywheel is a device including a rotor assembly and an inertia element which can be used as a means for storing kinetic energy. The majority of the stored energy is stored in the inertia element which has a high moment of inertia relative to other elements of the rotor assembly, such as an electrical machine and mountings for low friction bearings.

An electrical machine is commonly used for accelerating the inertia element in order to store energy, or decelerating the inertia element to release energy. The inertia element stores energy by virtue of its angular momentum; the faster it rotates, the more energy is stored, with energy storage being proportional the square of angular speed.

In order to store a high level of energy (i.e. have high capacity for energy storage), the inertia element must operate at very high peripheral speeds, typically above the speed of sound (as measured in air under standard atmospheric conditions as opposed to conditions within the casing of the flywheel). The structure of the inertia element in an energy storage flywheel is therefore noticeably distinct from that of an inertia element in a flywheel designed for other applications.

For example, a markedly different application is to provide a flywheel mounted on the crankshaft of an internal combustion engine for smoothing out intermittent torque and preventing the engine from stalling. A flywheel used for such smoothing typically has a rotor peripheral speed in the order of tens of metres per second (comparatively low energy capacity), whereas energy storage flywheels have rotor peripheral speeds in the order of hundreds of metres per second (comparatively higher energy capacity). The result is that the flywheel for such smoothing application is not subjected to the very high stresses that the energy storage flywheel type must resist. A further distinction is that the energy storage flywheel is able to retain energy for periods of many seconds, minutes or even hours and then delivery it when needed. In the case of a flywheel used for torque smoothing, small amounts of energy are transferred in and out of the flywheel in a passive manner in synchronicity with the pulsations of the internal combustion engine.

The energy stored per unit mass of rotor material in an energy storage flywheel is thus around 10-100 times greater than that of a flywheel used for engine torque smoothing, and the energy storage flywheel needs to be volumetrically compact and light to offer performance which is competitive with other energy storage technologies such as electric batteries.

A major design challenge for inertia elements used in the energy storage class of flywheels is how to withstand the high centrifugal stresses induced by the high peripheral speeds, whilst at the same time also maximising safety during operation of the energy storage flywheel.

One approach is to ensure that the risk of rotor structural failure is made negligible, i.e. that the flywheel inertia element should never undergo material failure. This may be done by using materials of ultra-high quality, using non-destructive testing means to ensure material quality and carefully monitoring use of the rotor, in particular its number of operational cycles completed. Such techniques have been developed by the aerospace industry but the materials required and monitoring undertaken are both costly and time-intensive.

Another approach is to accept that the inertia element may fail during operation and, even though this would be a rare occurrence, expelled fragments from the inertia element (having high linear kinetic energy) must then be contained by means of a casing to avoid damage to property, or, in more serious cases, human casualties. This may be achieved at a comparatively lower cost than the first approach above, because lower cost materials can be used for mass manufacture, and less rigorous monitoring is required so maintenance costs can be lower. However, to ensure safety, the mass of the containment element needs to be substantially greater than that of the inertia element to be contained, with experts recommending a figure of around ten times the mass of the inertia element. The size and expense involved in implementing such safety means that the main practical implementation is to put the energy storage flywheel (typically having monolithic steel inertia element) in an underground bunker. However, the installation cost is still high and there is reduced flexibility in how the stored energy can be installed.

A third approach is to make the inertia element from fibrous composite materials which can result in materials substantially stronger than those in the above approaches. It was once thought that composite materials would always fail in a relatively benign manner, given that the inertia element would in theory break up into many small particles which could be contained more easily, e.g. using a lighter, cheaper casing than for the second approach. However, some failure modes of the inertia element can still be extremely violent due at higher energy storage levels, and can generate high pressure inside the casing. A flywheel energy storage system using composite material in the inertia element is therefore also normally placed in a very thick and heavy containment vessel or in an underground bunker for safety reasons.

A fourth approach is to use metallic materials for the inertia element. The metallic material is typically steel but, instead of using a monolithic cylindrical design, the inertia element can be assembled from a stack of thin discs or laminates. Since the highest stresses in a rotating disc are tangential and radial, using a series of thin discs means that the rotor can operate at as high a peripheral speed as (or an even higher speed than) a monolithic cylinder. Indeed, the stresses can actually be lower using such an approach since axial stresses are reduced. In the case of a structural failure in the inertia element of such construction, only a fractional part of the whole inertia element will end up being ejected. Therefore, this approach substantially reduces level of containment required for safe operation of the flywheel, and a much lighter casing can be used. That is, neither a thick heavy casing nor bunker installation is required, substantially reducing cost and facilitating flywheel installation above ground and in compact formations.

An important consideration for this fourth approach is to ensure that failure in one disc does not propagate to adjacent discs (and beyond), otherwise a cascade-type failure may occur and release fragments from more than one disc. In addition, the discs/laminates need to be firmly affixed to one another in the stack, and the stack must be connected to shafts such that the rotor can be located in bearings.

It should be noted from a commercial perspective that the ability to manufacture the flywheel rotor at low cost is critical. Otherwise, it remains cheaper to use alternative energy storage means, such as electrochemical batteries or ultracapacitors, even if those other means provide less practical solutions for energy storage applications where the ideal energy storage solution is a flywheel-based system.

U.S. Pat. No. 7,267,028 (Gabrys) discusses a laminate-type flywheel where it is recognised that a central hole in the discs would lead to high stresses, reduced peripheral speed and lower performance. In addition, favourable high strength properties could be obtained for thin steel as compared to a thick monolithic cylinder.

Gabrys discusses two ways of joining the discs and connection means to the shafts for the bearings. The first is described with respect to FIG. 12 of U.S. Pat. No. 7,267,028, which is substantially reproduced in FIG. 1 (prior art) of the present application. This first way relies on bonding the surfaces of the discs (1) by means of adhesive, soldering or braze (2). The connection means and the shafts (3) are also bonded.

The problem with this approach is that the joints are placed under very high stresses, requiring a very strong bond material to prevent failure of the bonds. However, if the bonds are strong, a crack which starts in one laminate is able to propagate to the other laminates, leading to undesirable cascade failure. The result is that the benign case of having only one laminate fail is not realised.

The reasons for the high stresses on the bonds are described below, with reference to FIG. 1 (prior art) of the present application, which has been annotated relative to FIG. 12 of Gabrys to facilitate the explanation.

When a disc rotates at high speed, the maximum radial and tangential stresses occur in the region around the centre of the disc. This causes the axial thickness of the disc to reduce due to the Poisson's ratio effect by an amount shown as $\Delta t$. The sectional shape of each disc during rotation is shown in dotted lines, which the deformation exaggerated for the purpose of illustration. Since the bonding is relatively thin, it is difficult for this to absorb the effect of the discs pulling apart at the bore unless the bonding is very strong.

There is an additional problem concerning the connection means of the shafts in which the small discs each have a lower diameter than the main discs. The radial growth of the upper small disc illustrated by $\Delta r_2$ will be less than that of the adjacent main disc $\Delta r_1$. This will cause substantial shear stresses in the bonding which must therefore be strong enough to resist this.

However, with strong joint bonding, a cascade failure will not be avoided if a crack develops in one of the discs for the reasons described earlier. In this case, a crack is most likely to form around the centre of one of the discs. As it grows radially outwards and across the disc, stress in the two adjacent discs increases as the load is transferred to these discs via the strong bonding. Given these adjacent discs are already operating under higher stresses, this increase in local stress will likely cause cracks to develop in the adjacent discs. This sequence will repeat until several, if not all, of the discs are cracked, leading to a multiple disc failure mode which is highly undesirable.

Lastly, the addition of stepped features (see FIG. 13 of Gabrys) may strengthen the joints, but it will lead to high stresses in the discs at the corners of the stepped features in the female side of the fitting. Manufacturing the stepped features is also expensive.

U.S. Pat. No. 10,138,980 (Sanders et al.) attempts to address some of the problems discussed above by the use of spigots on each of the discs, and the use of a collar between each of the joints. However, these joints require precision manufacture. This may be viable for a limited manufacture of very large flywheels of the weights described by Sanders, but would be very cost-prohibitive for mass production of flywheels. This structure may also be somewhat unstable during use given that the joints have a low diameter and the discs are not mechanically locked together.

EP2759043 (Pullen) describes a laminated flywheel construction in which bolts can be inserted through the discs via specially-shaped apertures, for reduction of stresses at the apertures. FIG. 2 (prior art) of the present application depicts FIG. 14 of EP2759043, in which the disc stack (12) is clamped between two end plates (20) using an array of bolts (42, 44). The end plates (20) allow the disc stack to be connected to shafts for rotation. The bolts pass through specially shaped apertures in the discs (12) and are stabilised in position within the holes by inserts. The disc with openings in EP2759043 is intended to operate at the same speed as one without openings. However, to ensure flywheel stability, the structure requires precision fits between its parts, which is expensive.

It is an object of the present invention to reduce or substantially obviate the above problems by providing a flywheel which can be manufactured at relatively low cost, whilst ideally having safety features comparable to or better than those afforded by a laminated construction.

STATEMENT OF INVENTION

According to a first aspect of the present invention, there is provided a flywheel comprising

- a plurality of discs (or laminae/laminates) arranged in a stack, including at least first and second end discs at either end of the stack, each of the plurality of discs including a plurality of disc apertures therethrough,
- first and second plate members (or cheek plates) disposed at opposing ends of the stack, one or both of the first and second plate members including a plurality of plate apertures therethrough for alignment with a corresponding series of disc apertures through the stack, and
- connection means for clamping the first and second plate members together about the stack of discs, the connection means extending through each of the plurality of disc apertures without contacting the plurality of discs.

The flywheel is safer than conventional flywheels because the connection means (such as one or more bolts) does not contact the disc apertures, only the plate members. This helps to avoid transferring excessive stress from the connection means to the discs during flywheel rotation, which might otherwise contribute to crack formation/propagation and catastrophic failure. The flywheel is safer to operate and can be operated for a longer time at the high rotational speeds (preferably supersonic speeds, relative to the speed of sound in air at atmospheric pressure) required for substantial energy storage.

The flywheel may have a kinetic energy storage capacity of at least 100 kilojoules (kJ) during use. Preferably, the flywheel may have a kinetic energy storage capacity of at least 200 kJ, at least 250 kJ or at least 300 kJ.

The flywheel may be capable of achieving a peripheral speed of at least 350 metres per second ($ms^{-1}$) during use.

The flywheel (in particular, the inertia element thereof) may have a minimum stored energy of 25 kJ per kilogram during use.

Each disc may be considered as an inertia element (or laminated element) of the flywheel. Each disc is configured or structured for the stack to store a majority of the kinetic energy in the flywheel during rotation.

The disc apertures may be offset from a longitudinal axis of the stack. That is, the axis about which the stack rotates during use as part of the flywheel.

A minimum width of each plate aperture may be substantially less than a width of each disc aperture. In other words, the disc apertures in a particular linear series may be wider than the plate aperture(s) where they meet the end(s) of the disc aperture series.

This means that the or each plate aperture can provide support to the connection means. This also provides a space or gap around the connection means for spacing it from the walls of the disc apertures. The space may be an air-filled space.

The connection means may be unsupported by the disc apertures. That is, the entire length of the connection means that is disposed within the disc apertures may be spaced from the disc apertures without any bridging or supporting structure that extends across the space from the disc aperture wall to the connection means.

Each disc aperture may have a lateral wall facing the connection means. Each lateral wall may extend in a direction along the stack from one face of the disc to the other. The lateral walls may together provide at least one substantially uninterrupted bore through the stack.

The first and/or second plate member may include one or more clamping areas. The clamping area(s) may be in abutment with the respective first and/or second end discs. The first and/or second plate member may include at least one recessed area. The recessed area(s) may be substantially spaced apart from the respective end disc.

The or each plate member may thus be shaped such that they clamp about a peripheral or outer region of the disc stack, e.g. clamping to an annular region of the end disc(s). The recessed area(s) space a second region of the or each plate member from the end disc(s). This can optimise safety and flywheel performance during flywheel rotation, such as by helping to minimise stresses resulting from differential radial movement of the discs and end plate members.

The or each plate member should ideally be structured such that during use it is subject to levels of stress comparable or similar to the stresses that the discs are subjected to.

The mass of the plate member(s) should be selected such that if the plate member(s) fail catastrophically, the containment requirements for an installation around the flywheel to safely contain outbound plate fragments should not significantly exceed the containment requirements for the scenario where part of the disc stack fails catastrophically.

The recessed area(s) may be closer to the centre of the stack than the clamping area(s). The or each plate member may have one or more additional regions which engage or abut the end disc(s) in a central region of the end disc(s), inset from the recessed area(s).

The at least one recessed area may be substantially concave. The at least one recessed area may be substantially annular in shape. That is, the vacant footprint on the or each end disc may be substantially annular, due the shape of the adjacent recessed area(s).

The concave region provides a space between part of the plate member and the opposing end disc surface. The annular shape helps to evenly distribute forces during flywheel rotation.

One or more layers or films of material may be provided between at least one (and preferably each) pair of adjacent discs in the stack for minimising slip between the adjacent discs during use. The one or more layers or films may be provided on the surface of one of the pair of adjacent discs. The layers of material may be different to the material of the bulk of the disc.

During use, it is possible but undesirable that the discs may slip relative to each other over time, despite being connected or clamped via the plate members. Providing the one or more layers on the discs minimises or substantially prevents the discs slipping relative to each other during use. It can also minimise or substantially prevent the end discs slipping relative to the plate members during use. In other words, slip at the disc-disc and disc-plate joints is mitigated. It will be appreciated that the bonding preventing slipping must not be too strong; otherwise, there is a possibility that a crack from one disc could cross or propagate to an adjacent disc.

The layer(s) of material may include any one or more of: a thermoplastic, a thermoset plastic, and a soft metal or alloy (such as a metal/alloy with a low melting point). An example of a low-melting point alloy is solder or braze.

The material(s) of the layer(s) may be selected to have a melting point below around 600° C. This is particularly useful where the discs are made of steel. Temperatures above 600° C. can adversely affect the structure/strength of the steel, i.e. its heat treatment.

The one or more layers or films may include a substantially annular layer or film for at least one (and preferably each) pair of adjacent discs. The annular layer or film may be arranged to partially or wholly surround each disc aperture.

During flywheel rotation, the discs can to some extent thin out and separate from each other, which minimises contact area between opposing centre regions of adjacent discs as discussed earlier. By applying the layer as an annular layer, the disc separation during use does not have much impact on the interface between adjacent discs or the interface between the end disc(s) and the adjacent plate member.

In some cases, the layers may only be applied around the disc apertures which is where maximum clamping pressure is applied and this can be sufficient to prevent slipping whilst minimising overall contact area between adjacent discs during use.

The one or more layers may be applied to each disc by plating or painting, or by positioning a thin film on each disc when assembling the disc stack prior to connecting the plate members about the stack.

A plurality of layers or films may be provided for at least one (and preferably each) pair of adjacent discs. Each layer or film may be arranged to partially or wholly surround each disc aperture. The plurality of layers or films on the surface of the or each disc may include a plurality of single partial layers/films arranged such that each of them is disposed in a common plane between a pair of the discs.

It will be appreciated that some adjacent pairs of discs in the stack may have an annular layer or film between them, whilst some adjacent pairs of discs in the stack may have a plurality of layers or films between them.

The connection means may include one or more bolts, rivets or threaded studs. The bolt(s) or rivet(s) or threaded stud(s) may include a sidewall with an outer surface for fitting within walls of a series of aligned disc apertures.

A plurality of the connection means may be arranged on a pitch circle for minimising stress transfer between discs.

Each bolt or threaded stud may be independently selected to be solid or to be hollow.

Using hollow bolts/studs minimises weight and reduces stress in the bolt/stud. It can also minimise stresses on the plate members.

The cross-section of each bolt or stud may be substantially constant.

The outer surface of some or all of the bolt(s) or stud(s) may taper inwardly towards a middle section of that bolt or stud. That is, some or all of the bolt(s) or stud(s) may have a tapered external cross-section.

The outer surface of some or all of the bolt(s) or stud(s) may include a plurality of inwardly tapered sections (two, or three, or four or more). For example, two tapered sections may be provided along the bolt/stud. That is, the bolt/stud may have a non-tapered thickness at its middle and end portions, and tapered or thinner sections between the middle and each end.

Where two or more tapered sections are provided, they may be spaced along the bolt/stud and/or separated by non-tapered sections for support by a suitable number of intermediate support members. Each tapered section may be thinnest at a position substantially equidistant between two neighbouring intermediate support members or between an intermediate support member and an end plate respectively, depending on the number of intermediate supports and tapered sections.

Where multiple tapered sections are provided, the external surface of the bolt/stud may be considered undulate, decreasing and increasing in thickness along the bolt/stud.

Using tapering bolts/studs minimises weight (particularly if hollow) and reduces stress in the bolt/stud. It can also minimise stresses on the plate members.

The cross-section of the outer surface of some or all of the bolt(s) or threaded stud(s) may be curved for minimising stress in the bolt(s) or stud(s). That is, some or all of the bolt(s) or stud(s) may have a curved external cross-section.

The outer surface of some or all of the bolt(s) or stud(s) may include a plurality of curved portions (two, or three, or four or more) along each bolt/stud. For example, two curved sections may be provided along a given bolt/stud. That is, the bolt/stud may have a straight section in its middle (or cylindrical part of the bolt/stud) and optionally similar sections at its end portions, and curved sections between the middle and each end.

Where two or more curved sections are provided, they may be equidistantly spaced along the bolt/stud and/or separated by straight or linear sections for support by a suitable number of intermediate support members. Each curved section may be thinnest at a position substantially equidistant between two intermediate support members or between an intermediate support member and an end plate respectively, depending on the number of intermediate supports and curved sections.

The cross-section of the outer surface of some or all of the bolt(s) or threaded stud(s) may be elliptical.

Using bolts/studs with a curved external cross-section minimises weight (particularly if hollow) and reduces stress in the bolt/stud. It can also minimise stresses on the plate members, potentially more than a tapered bolt/stud.

The bolt(s) or threaded stud(s) may be curved. That is, the bolt or stud may extend along (or follow) a curved longitudinal axis. The curved longitudinal axis may approximate or follow at least part of a catenary curve.

A catenary shape reduces stress in the bolt/stud and can also reduce stresses on the plate member(s). It will be appreciated that if the catenary-shaped bolt/stud does not meet the plate member perpendicularly, then the plate member may include a correspondingly angled surface for locating the bolt/stud and minimising stress at the connection during use.

Each disc aperture in a series of disc apertures may be substantially the same shape and size.

The plate apertures may have a different shape to the disc apertures.

The size of the disc apertures and/or plate apertures may need to be comparatively larger for a catenary bolt/stud than for a linear bolt/stud. This is so that the curved bolt/stud does not contact any of the adjacent discs when positioned through the series of disc apertures.

A first set of the disc apertures in a given series may be aligned along a first common linear axis. A second set of the disc apertures may be aligned along a second common linear axis. The second common linear axis may be offset from and substantially parallel to the first common linear axis. One or more additional sets of disc apertures may be aligned along one or more additional common linear axes respectively. These features may be provided where the connection means is curved.

Put another way, instead of an arrangement of substantially identical disc apertures which are aligned on a common axis, two or more different shapes and/or positions of the disc apertures in a series may be provided for receiving a particular catenary bolt/stud. That is, two or more disc types may be provided. This can allow some or all of the disc apertures to be comparatively smaller, maintaining structural integrity in each disc.

The plurality of discs may include one or more intermediate discs, or preferably two or more intermediate discs. The intermediate disc(s) may be disposed between the first and second end discs.

At least one intermediate support member (or plate) may be disposed between the end discs, adjacent to the one or more intermediate discs. The at least one intermediate support member may be disposed between two intermediate discs in the stack for supporting the connection means within the stack. The intermediate support may be disposed in a middle of the stack.

Where the bolt or stud is relatively long, it may experience higher stresses during flywheel rotation. To compensate for this, an intermediate plate or plates provided in the disc stack may support the bolt or stud at one or more regions midway (or partway) through the stack. If the bolts/studs have a plurality of tapered or curved sections then multiple intermediate plates can be provided to support some or all of the non-tapered or non-curved sections of the bolts/studs.

The intermediate plate(s) may have a different diameter to the discs and/or the plate members. The intermediate plate diameter may be lower than the disc diameter.

The intermediate plate(s) may have a different shape to the discs and/or the plate members. For example, the intermediate plate(s) may not be shaped like a disc with holes. The intermediate plate(s) may be shaped similarly to the plate members for reducing flywheel stresses during rotation.

Locating means may be provided for locating disc apertures in the first and/or second end discs with the first and/or second plate members respectively.

The connection means are only located in the plate member(s) (and optionally intermediate plate(s), and is still necessary to securely locate each end of the stack to the plate member(s) for safe operation of the flywheel.

The locating means may include one or more spacers such as one or more washers.

The or each spacer may include a spacer body having a first sidewall and optionally a second sidewall. The first sidewall may be shaped for fitting to or into one of the disc apertures. The second sidewall may be shaped for fitting to or into a corresponding recess in one of the plate members.

The or each spacer may have an external shape similar to that of an end disc aperture.

Where multiple spacers are provided, some or all of the spacers may be shaped for precision fit to a plate member (or a portion thereof) and/or precision fit to an end disc.

The or each spacer may fit into a corresponding pocket or recess in the plate member, preferably positioned at or around a respective one of the plate apertures. The pocket/recess may be round and/or countersunk.

The first sidewall may be shaped to complement or correspond to the end disc aperture shape. The first sidewall may be elliptical or approximately elliptical in profile. The first sidewall may be circular or approximately circular in profile.

The second sidewall may be shaped to complement or correspond to the shape of a pocket/recess in the plate member. The second sidewall may be elliptical or approximately elliptical in profile. The second sidewall may be circular or approximately circular in profile.

The first sidewall may be approximately the same height as the second sidewall.

The spacer may be wider (along the x and/or y axes) than it is deep (along the z axis). The spacer may have a depth substantially less than one or both of: a depth of the end disc, and a depth of the plate member.

Approximately elliptical disc apertures can minimise disc aperture stress during flywheel rotation. Having a correspondingly elliptical spacer sidewall provides a good fit for mitigating stress transfer to the respective disc apertures which the spacer contacts in the stack.

The first sidewall may be wider than its corresponding disc aperture for conforming to that disc aperture when the plate members are clamped about the stack.

The second sidewall may be wider than its corresponding disc aperture for conforming to that disc aperture when the plate members are clamped about the stack.

In other words, to avoid the need for a precision-fit spacer and so minimise cost, the or each spacer may be over-sized compared to either or both of the disc aperture and/or plate member recess. Connecting/clamping the plate members about the stack when the spacers are in position causes them to conform to the space available after the plate members are secured about the stack.

In some cases, it may be preferable to manufacture spacers which are part-precision-manufactured, e.g. to provide precision fit in the plate member aperture. The remaining part, e.g. the portion for fitting to the disc aperture, may be over-sized as described above. This still minimises cost to some extent, particularly where the disc apertures are non-circular and the plate member apertures are (approximately) circular.

The first and/or second plate members may include a circumferential lip configured to fit around the periphery of one or both of the first and second end discs respectively.

The first and/or second plate members may include a plurality of lip members spaced apart and configured to fit around sections of the periphery of one or both of the first and second end discs respectively.

The lip or lip members may be considered to be continuous or partial versions of the same means for engaging the periphery of a disc. The lip or lip members can be used instead of or in conjunction with the locating means (such as spacers) discussed above for locating the plate members with the disc stack.

The end disc(s) may have a precision-manufactured diameter. The lip or lip members may be precision-manufactured to fit that diameter.

According to a second aspect of the present invention, there is provided a flywheel comprising

- a plurality of discs (or laminae/laminates) arranged in a stack, including at least first and second end discs at either end of the stack, in which each disc includes a central region and a peripheral region disposed around the central region, the peripheral region being adjacent to (or near) a peripheral edge of the disc,
- first and second plate members (or cheek plates) disposed at opposing ends of the stack, and
- bonding means which bonds only part of each disc to each neighbouring disc in the stack, including bonding together adjacent peripheral regions of neighbouring discs, and which bonds each of the first and second plate members respectively to the first and second end discs of the stack.

The flywheel is safer than conventional flywheels because the bonding means only bonds part of each disc surface to the adjacent disc or plate member. The structure relies only on bonding of the discs to themselves and the plate members in order to maintain structural integrity. Central regions of the discs may not be bonded together.

Unlike strong joint bonding across the whole surface of each disc, partial bonding in this way avoids a cascade failure if a crack develops in one of the discs. Bonding in the peripheral region helps to minimise the likelihood of crack propagation from a centre of a disc during flywheel rotation, which could otherwise lead to catastrophic failure. The flywheel is safer to operate and can be operated for a longer time at the high rotational speeds (preferably supersonic speeds, relative to the speed of sound in air at atmospheric pressure) required for substantial energy storage.

In this aspect of the invention, the flywheel does not include a clamping means for clamping the discs in the stack together. That is, there are no clamping elements which clamp the plate members about the stack.

The flywheel discs do not need to include disc apertures for a connection element. The plate members do not need to include one or more plate apertures for a connection element.

The bonding means may include adhesive, such as an epoxy resin. Any suitably strong bonding means or engineering adhesive for tolerating flywheel rotation may be used.

The strength of the bonding means/material (both to each disc surface and within the body of the bonding means) should be selected such that the flywheel maintains sufficient structural integrity during rotation but resists/mitigates crack propagation through the bonded area, if a crack develops in a disc.

Adjacent central regions of neighbouring pairs of discs may be spaced apart. This includes the central regions being spaced apart when the flywheel is at rest (i.e. not rotating), taking account of disc thinning which occurs during flywheel rotation as discussed earlier.

The peripheral region of at least one (and preferably some or all) of the discs is at least marginally thicker than the central region of those discs for spacing the central regions apart. That is, to space apart adjacent central regions of neighbouring pairs of those discs. It will be appreciated that this limits the contact area between adjacent discs. The contact area may be less than 100% of the disc-facing area of a given disc.

This can provide a raised area or landing on one or both sides of a disc, for bonding to another raised area or landing on another disc/plate member.

The provision of landings limits the size of the bonded area between adjacent discs to a relatively small region or annulus. This means that the peeling effect of Poisson's ratio thinning is mitigated or not experienced during flywheel rotation.

The landings can be formed by stamping the discs, for example, although any other suitable means may also be used. The stamping may form relatively uniform landings and also reduce the thickness of the disc in its central region (on one or both end faces of the disc). It will be appreciated that the stamping operation may only result in change to disc thickness on the order of microns, for example, as long as the landings are sufficiently raised from the thinner central region of the disc to mitigate/avoid the peeling effect noted above.

The peripheral region at least one disc (and preferably some of the discs or of each disc) may include a substantially planar surface or landing. The substantially planar surface or landing may be bonded to a corresponding substantially planar surface or landing in the peripheral region of a neighbouring disc.

One or more shims (or landing elements) may be provided for one or more of the neighbouring pairs of discs in the stack, for spacing the central regions apart. The or each shim (or landing element) may be bonded, optionally on both sides to adjacent peripheral regions of a neighbouring pair of discs. Adjacent central regions of those neighbouring pairs of discs may be spaced apart by the shim(s).

The shims or landing elements may be thin compared to the thickness of a given disc.

The shim(s) may be made of metal or metal alloy, or any other suitable material. If the shim(s) are made of metal or metal alloy, then this may be or include any of steel, aluminium or titanium, although other suitable metals/alloys are also contemplated and this list should not be construed as exhaustive.

The bonding means may include or consist of one or more annular-shaped bonded regions between each pair of neighbouring discs in the stack. If any shims are provided, then the shim(s) may be substantially annular in shape.

During flywheel rotation, the discs can to some extent thin out and separate from each other. Providing peripheral annular bonding between the discs, optionally via shim members, means that the disc thinning has reduced impact on the bonding between adjacent discs and/or between the end disc(s) and the adjacent plate member.

According to a third aspect of the present invention, there is provided a flywheel comprising a plurality of discs arranged in a stack, including at least first and second end discs at either end of the stack, each of the plurality of discs including a plurality of disc apertures therethrough, first and second plate members disposed at opposing ends of the stack, one or both of the first and second plate members including a plurality of plate apertures therethrough for alignment with a corresponding series of disc apertures through the stack, in which one or both of the plate members includes one or more recesses which are disposed on a disc-facing side thereof and positioned adjacent to one or more of the plurality of plate apertures, and connection means for clamping the first and second plate members together about the stack of discs, the connection means extending through each of the plurality of disc apertures, in which a spacer or space-filling means is provided between the or each connection means and the respective disc apertures for supporting the connection means, the spacer or space-filling means extending from a position within the stack into the one or more recesses of one or both of the plate members.

The flywheel is safer than conventional flywheels because the connection means (such as one or more bolts) is supported along some or all of its length within the stack. This mitigates stress transfer or more evenly distributes stresses from the connection means to the disc apertures which in turn minimises the likelihood of cracks forming in a disc or propagating between discs during flywheel rotation, which could otherwise lead to catastrophic failure. The flywheel is safer to operate and can be operated for a longer time at the high rotational speeds (preferably supersonic speeds, relative to the speed of sound in air at atmospheric pressure) required for substantial energy storage.

The spacer or space-filling means may be in the form of a sleeve which extends into the one or more recesses of one or both of the plate members. The sleeve may be elongate.

The sleeve may be fitted around the connection means. The sleeve may have an external sidewall profile which substantially matches or corresponds to an internal sidewall profile of some or all of the disc apertures in a series of aligned disc apertures in the stack for snugly fitting therein.

The sleeve may be rigid or flexible. The sleeve may include one or more cavities or channels, preferably if the sleeve is flexible. The cavities/channels may be considered to be cut-outs or part of an extruded profile of the sleeve, although it will be appreciated that extrusion is not the only means of forming the sleeve(s).

The channels can help to reduce the mass of the spacer (compared to a solid equivalent thereof) for minimising stress between the sleeve and the disc aperture(s) it contacts. The channels can also increase the flexibility of the spacer for more evenly spreading load on the disc aperture(s).

The spacer or space-filling means may comprise a set material. That is, a material which sets, dries, solidifies or cures once provided in flywheel.

The material may be injected or otherwise introduced into the flywheel after the rest of the flywheel has been assembled. This can simplify the mechanical assembly process.

The connection means may include a conduit for conveying a material flow which is suitable for forming the set material. The conduit may provide a flow path to the one or more disc recesses and the space between the connection means and the disc apertures. The conduit may be provided in or through the connection means.

The set material may include any one or more of: a thermoplastic material, optionally with or without including a strengthening filler or fibre; a thermoset plastic material or epoxy, optionally with or without including a strengthening filler or fibres; and a soft metal or low melting-point metal (or metal alloy).

Any flywheel according to one of the preceding aspects of the invention may include any feature or independently selected combination of features presented with respect to any other aspect of the invention, to the extent that including such selected features does not conflict with the features of that aspect of the invention.

A flywheel assembly may be provided which comprises one or more flywheels according to any one or more preceding aspects of the invention.

The or each flywheel may be mounted on or to a drive assembly for facilitating rotation of the or each flywheel, for storing energy in or deploying energy from at least one of the flywheels. The drive assembly may be mechanical, electrical, or any other suitable form of drive means.

BRIEF DESCRIPTION OF THE DRAWINGS

For a better understanding of the present invention, and to show more clearly how it may be carried into effect, reference will now be made by way of example only to the accompanying drawings, in which:

FIG. 6 shows a partial cross-sectional side view of a third embodiment of a flywheel, including a fifth version of connection means;

FIG. 7 shows a partial cross-sectional side view of a fourth embodiment of a flywheel, including an intermediate support member;

FIG. 11 shows a partial cross-sectional side view of a sixth embodiment of a flywheel;

FIG. 11A shows a perspective view of a second version of a locating means for the flywheel of FIG. 11;

FIG. 13 shows a partial cross-sectional side view of an eighth embodiment of a flywheel;

FIG. 13A shows a perspective view of the flywheel of FIG. 13;

FIG. 14 shows a partial cross-sectional side view of a ninth embodiment of a flywheel;

FIG. 14A shows a perspective view of the flywheel of FIG. 14;

FIG. 15A shows a cross-sectional side view of a tenth embodiment of a flywheel;

FIG. 15B shows an enlarged partial cross-sectional side view of the flywheel of FIG. 15A;

FIG. 15C shows an enlarged partial cross-sectional side view of a variant of the flywheel of FIG. 15A;

FIG. 16 shows a cross-sectional side view of an eleventh embodiment of a flywheel;

DESCRIPTION OF PREFERRED EMBODIMENTS

Figures 1, 2:
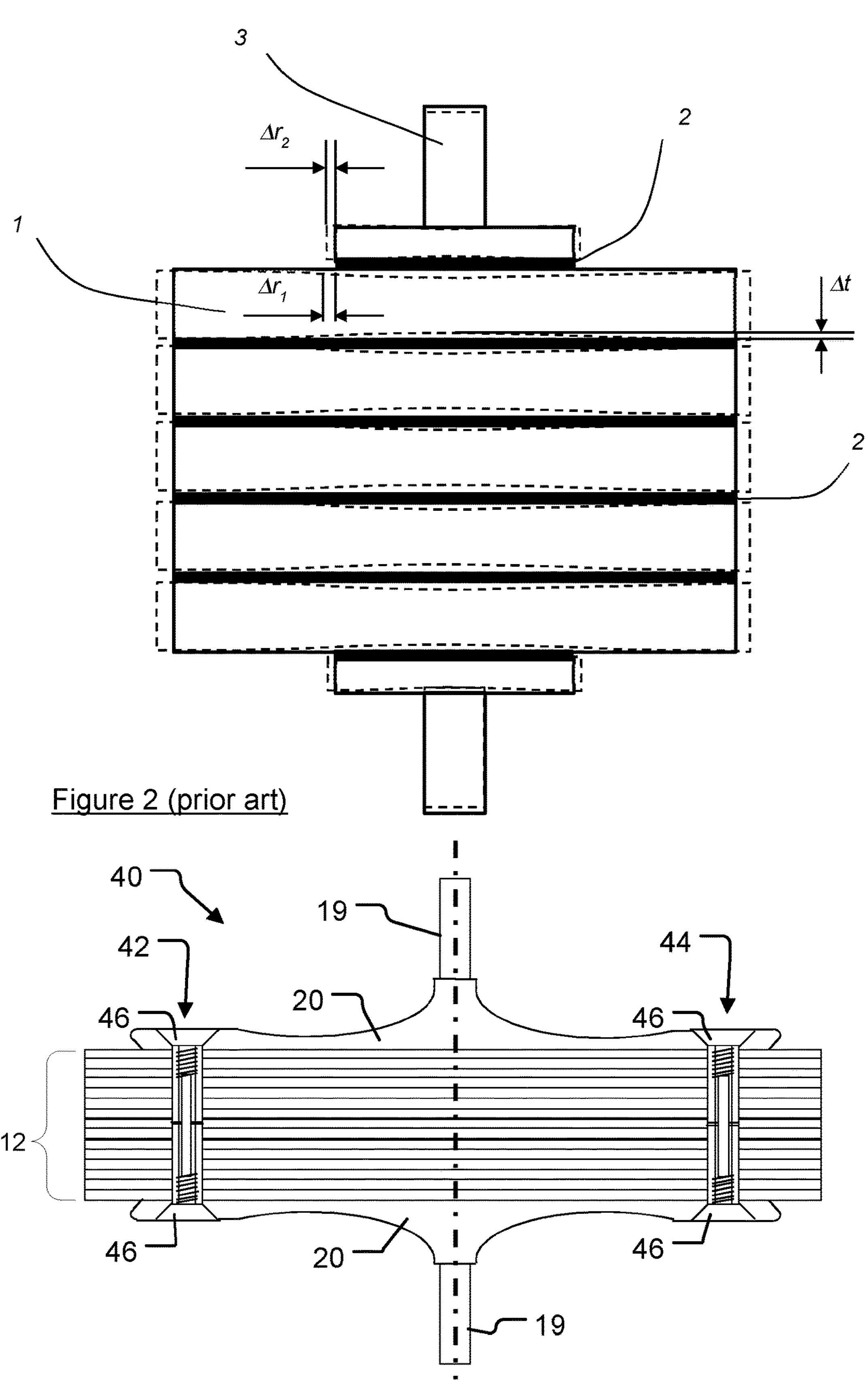
FIG. 1 shows a side view of a first prior art flywheel device from U.S. Pat. No. 7,267,028.
FIG. 2 shows a cross-sectional side view of a second prior art flywheel device from EP2759043.

FIGS. 1 and 2 relate to prior art devices, which are described in the background section.

Figure 3:
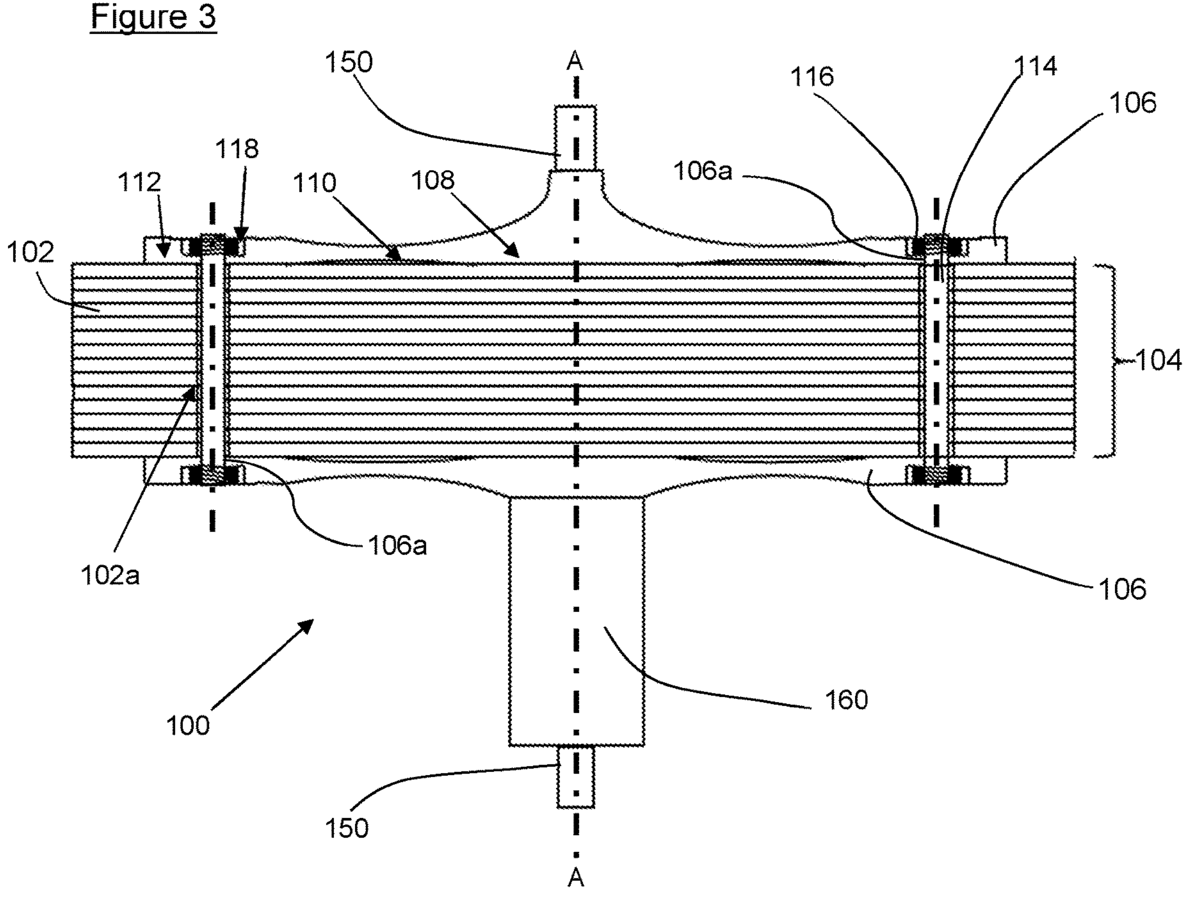
FIG. 3 shows a cross-sectional side view of a first embodiment of a flywheel.
Figure 3A:
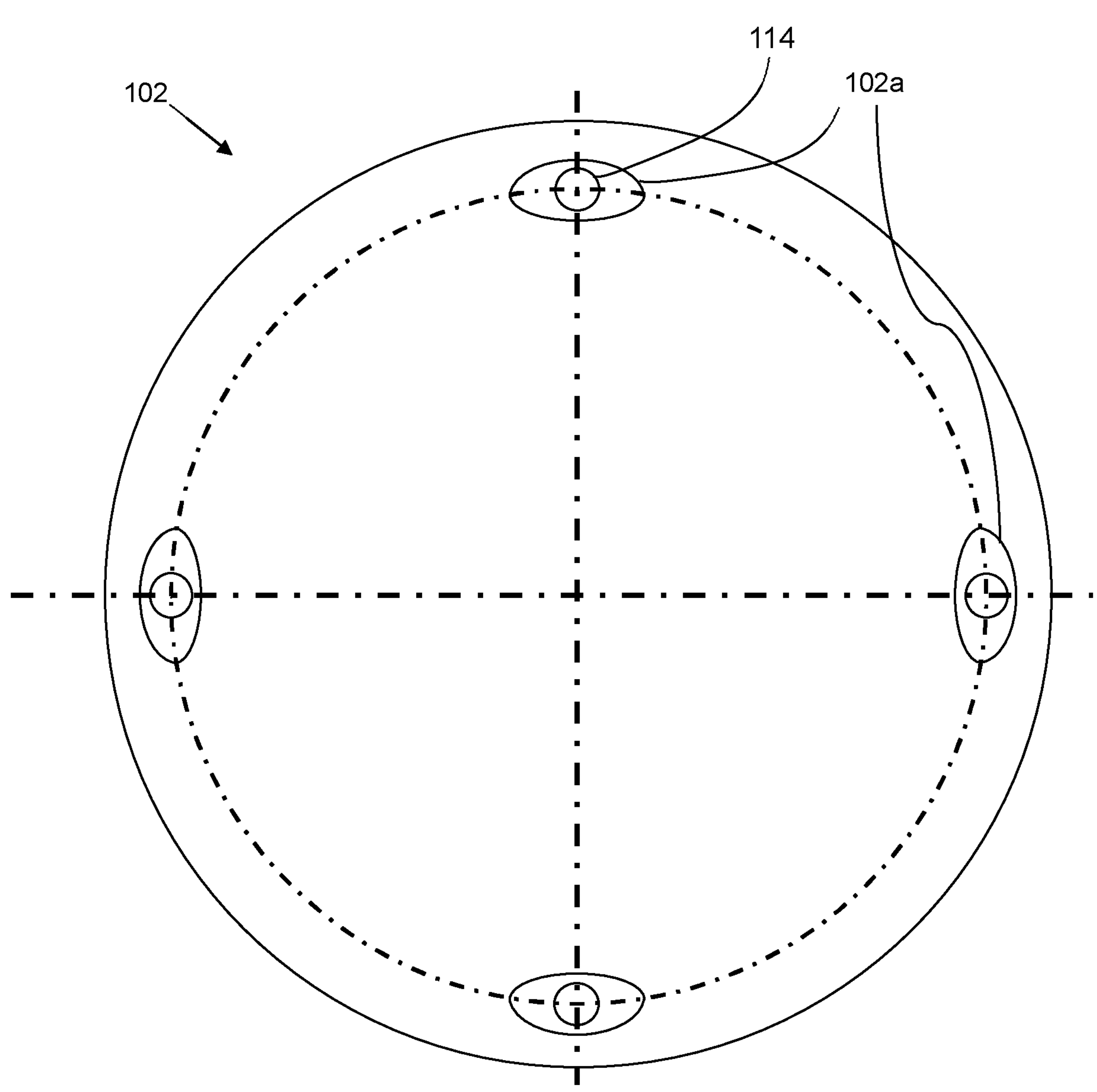
FIG. 3A shows a top view of a disc of the flywheel of FIG. 3.

FIGS. 3 and 3A relate to a first embodiment of a flywheel, indicated generally at 100. The flywheel 100 is designed for use in kinetic energy storage which can be used, in conjunction with a suitable electrical motor-generator or mechanical drive (or any other suitable type of drive means) to provide a means of storing electrical energy.

Many applications are possible for the flywheel 100, including but not limited to any one or more of: local grid boosting for fast charging electric vehicles; uninterruptible power supplies; trackside rail; demand side management; and electrical grid services as some examples. The flywheel 100 could be provided in a vehicle with an electric propulsion system, such as a car, truck, bus, train, plane or boat.

The flywheel 100 could also be used to provide kinetic energy storage where the stored energy can be transmitted mechanically to assist a vehicle accelerating and to retrieve otherwise lost kinetic energy. The structure of the flywheel 100 is primarily described with respect to the flywheel at rest, unless otherwise specified.

The flywheel 100 includes a plurality of discs 102 (also referred to as laminates). In this embodiment fourteen discs 102 are provided, but it will be appreciated that any suitable number of discs may be provided in other embodiments subject to there at least being first and second end discs.

The discs 102 are substantially circular in profile in this embodiment. Centres of the discs 102 are aligned along a common longitudinal axis A-A to provide a stack 104 of discs. The stack 104 is substantially cylindrical in this embodiment.

The stack 104 may be considered to provide an inertial element of the flywheel 100. The stack 104 may be considered as a laminate stack.

The discs 102 may each be made of steel in this embodiment, although another suitable metal, alloy or composite material may be used in other embodiments.

Each disc 102 has a plurality of disc apertures **102*a* in this embodiment. Each disc 102** in the stack is substantially the same in this embodiment, preferably to a tolerance on the order of microns or tens of microns.

One of the discs 102 is depicted in FIG. 3A and has four disc apertures **102*a*. The disc apertures 102*a* in each disc 102 are aligned on common axes with corresponding disc apertures in the other discs in the stack 104** in this embodiment. This provides a plurality of sets or series of aligned disc apertures through the stack (in this case four sets), which may be considered to be stack apertures.

It will be appreciated that any suitable number of disc apertures may be provided through the discs 102, in any suitable positions and sizes, for allowing the discs to be secured together by connection means.

The disc apertures 102*a* are disposed near the periphery of each disc 102. The disc apertures 102*a* are equidistantly spaced around the axis A-A. The disc apertures 102*a* may be considered to be arranged on a pitch circle, indicated by the imaginary circular dot-dash line in FIG. 3A. In this embodiment, the discs each have four-fold rotational symmetry when viewed end-on.

The shapes of the disc apertures 102 are selected to minimise stresses during disc rotation at flywheel speeds. Details of suitable shapes are discussed in EP2759043 which is incorporated herein by reference.

Each disc aperture 102*a* is approximately elliptical in profile in this embodiment. The pitch circle intercepts a centre of each disc aperture in FIG. 3A. It will be appreciated that other embodiments may include various other non-circular shapes of disc aperture, or in some cases circular disc apertures.

A pair of plate members 106 (also referred to as cheek plates) are disposed at either end of the stack 104. The plate members 106 are secured or clamped together about the stack 104. The plate members 106 in this embodiment each have a diameter which is less than a diameter of the disc stack 104.

The cheek plates 106 allow the laminate stack 104 to be connected to bearing landings 150. The cheek plates 106 also allow the stack 104 to be connected or fitted (or more generally provided in operative engagement) together with an electrical machine rotor part or mechanical drive part 160.

Each plate member 106 has a central stack-facing portion 108 which contacts a corresponding central region of one of the end discs 102.

Each plate member 106 has a substantially annular stack-facing portion 110 disposed around the central portion 108. The annular portion 110 is slightly recessed to space it apart from the respective end disc 102 of the stack 104. The annular portion 110 has a concave profile.

Each plate member 106 has a second substantially annular stack-facing portion 112, disposed around the first annular portion 110. The second annular portion 112 provides a clamping area or areas for securing together the plate members 106 about the stack 104.

Plate apertures 106*a* are provided through each plate member for receiving connection means. The plate apertures 106*a* are narrower than the disc apertures 102 where the plate apertures 106*a* open into the stack 104. The plate apertures 106*a* have a diameter which substantially corresponds to an external diameter of the connection means in this embodiment.

Each plate member 106 is thickest at the longitudinal axis A-A in this embodiment. Each plate member 106 gradually thins moving radially outwards from the axis A-A. The thinnest portion of each plate member 106 is approximately in the middle of the first annular portion 110. Each plate member 106 has an exterior concave region opposing the stack-facing concave portion 110. Moving further radially outwards, each plate member 106 is somewhat thicker at the second annular portion 112 than at the concave regions.

It will be appreciated that the form of the plate members is not considered to be essential to the present invention. Plate members like those of the prior art, such as those depicted in FIG. 2, may be used instead in related embodiments.

Whilst the flywheel is described above as having two plate members, it will be appreciated that embodiments are envisaged where only one plate member is provided at one stack end, if the other stack end is configured for securing the plate member in place to clamp the stack of discs together.

Connection means is provided to secure the plate members together. In this embodiment, a plurality of connection means are provided. The connection means in this embodiment is clamping means in the form of a plurality of bolts, rivets or threaded studs, referred to generally as clamping elements 114.

Each of the four clamping elements 114 in this embodiment is disposed centrally through a series of the disc apertures 102. The clamping elements 114 are provided on the pitch circle. Ends of the clamping elements 114 are secured by fixing means 116 (e.g. nuts or similar) which bear against the plate members 106 to provide a clamping force about the stack 104.

Recessed or countersunk external regions 118 are provided on the plates 106 for the fixing means to fit within. In this embodiment, external threaded portions of the ends of each clamping element 114 are disposed in the countersunk regions.

The clamping elements 114 do not touch the discs 102 or disc apertures 102*a*. The clamping elements 114 are only supported at the plate members 106 in this embodiment. This reduces stresses in the laminates 102 at the disc apertures 102*a* during high-speed flywheel rotation because the apertures 102*a* do not provide support to the clamping elements 114.

A gap is provided between the exterior of each clamping element 114 and the surrounding interior walls of the disc apertures 102*a* around it. Parts of the curved disc aperture walls immediately to either side of the clamping element 114 are seen most clearly in the cross-section of FIG. 4.

The flywheel 100 can provided as part of an assembly with a suitable drive mechanism. The assembly may be considered to be part of an energy harvesting and deployment system. The assembly is provided in containment suitable for safe operation of the flywheel, taking account of the mass and energy storage capacity of the flywheel.

During use, the flywheel 100 is rotated by the drive mechanism about the axis A-A to store kinetic energy in the flywheel 100. The flywheel 100 can deform radially outwards at speeds on the order of hundreds of metres per second, when used to store substantial amounts of kinetic energy.

The drive mechanism can be used to deploy a portion of the stored kinetic energy in a rotating flywheel by reducing the rotational rate of the flywheel, harvesting the stored kinetic energy and converting it into another useful form, e.g. electrical energy. Further instances of energy gathering and harvesting may be carried out as needed, which may include thousands or millions of cycles of energy deployment on the order of hundreds of kilojoules, several megajoules, or greater e.g. if multiple flywheels are provided in an assembly and work together in parallel.

Variations of the above flywheel embodiment and component parts are contemplated within the scope of the present invention. Features of the following embodiments are the same as above except where described otherwise.

Like reference numerals are used to refer to like features in the following embodiments, incrementing each numeral by a multiple of 100, e.g. feature 102 corresponds to features 202, 302 and so on in later embodiments.

Figures 4, 4A, 4B, 4C:
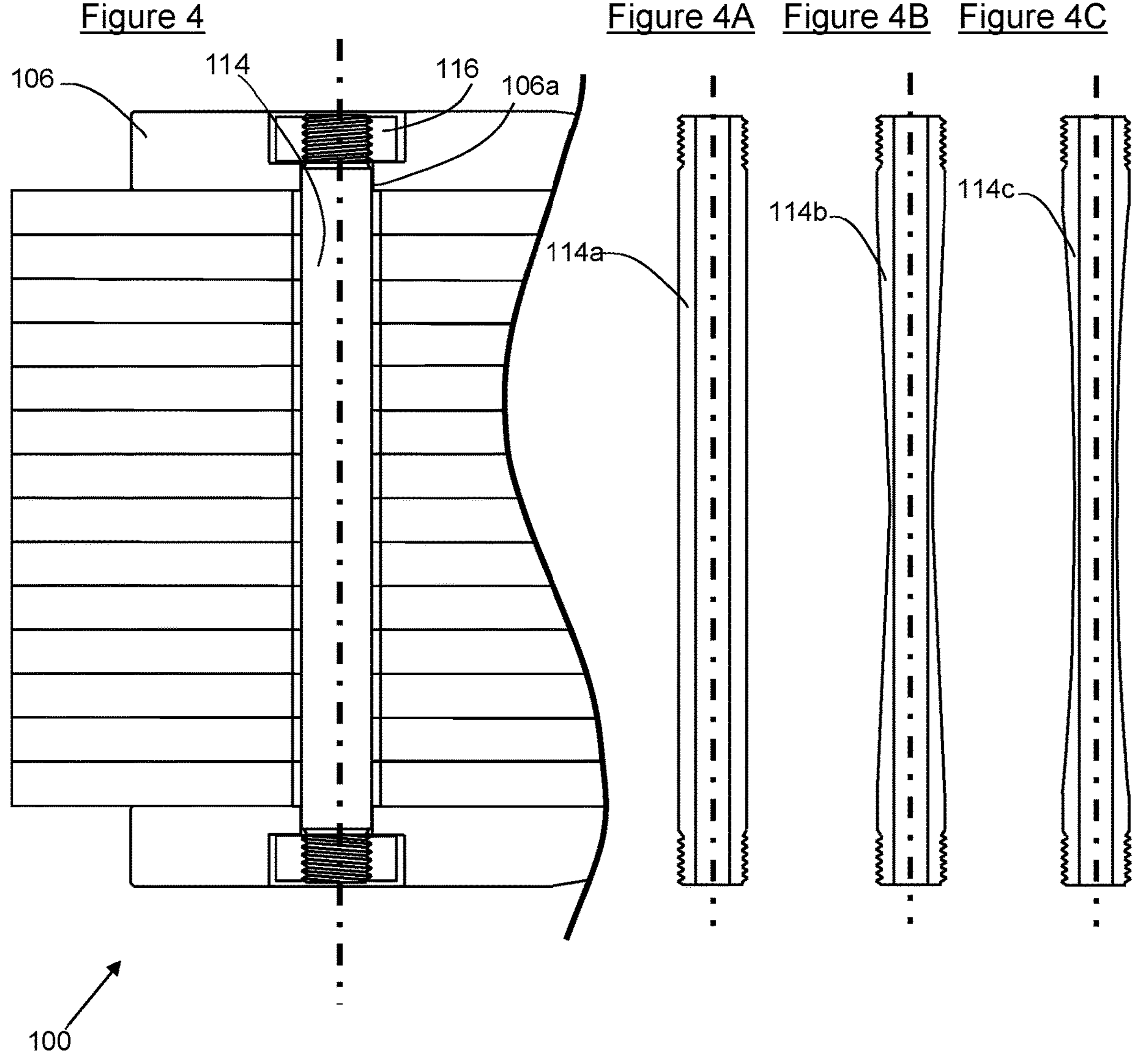
FIG. 4 shows an enlarged partial cross-sectional side view of the flywheel of FIG. 3, including a first version of a connection means for the flywheel.
FIG. 4A shows a cross-sectional side view of a second version of connection means for the flywheel of FIG. 3.
FIG. 4B shows a cross-sectional side view of a third version of connection means for the flywheel of FIG. 3.
FIG. 4C shows a cross-sectional side view of a fourth version of connection means for the flywheel of FIG. 3.

FIG. 4 depicts a first type of the clamping element 114 for the flywheel 100. The clamping element 114 is solid and has a substantially constant cross-sectional width.

A second type of clamping element 114*a* (FIG. 4A) is contemplated where the element is hollow instead of solid. The hollow bore extends through the entire length of the element 114*a* as shown, but it will be appreciated that a number of hollow sections or pockets could be provided inside the element instead.

A third type of clamping element 114*b* (FIG. 4B) is further contemplated where the element is hollow and has a tapered external cross-section. The external wall of the element 114*b* tapers inwards towards a middle of the element 114*b* from both ends as shown.

A fourth type of clamping element 114*c* (FIG. 4C) is yet further contemplated where the element is hollow and has a concave external cross-section. The curvature of the external cross-section provides an elongate mid-section which is substantially thinned along a majority of the length of the element 114*c*.

Each of the first to fourth types of clamping element 114-114*c* is a linear clamping element.

Figure 5:
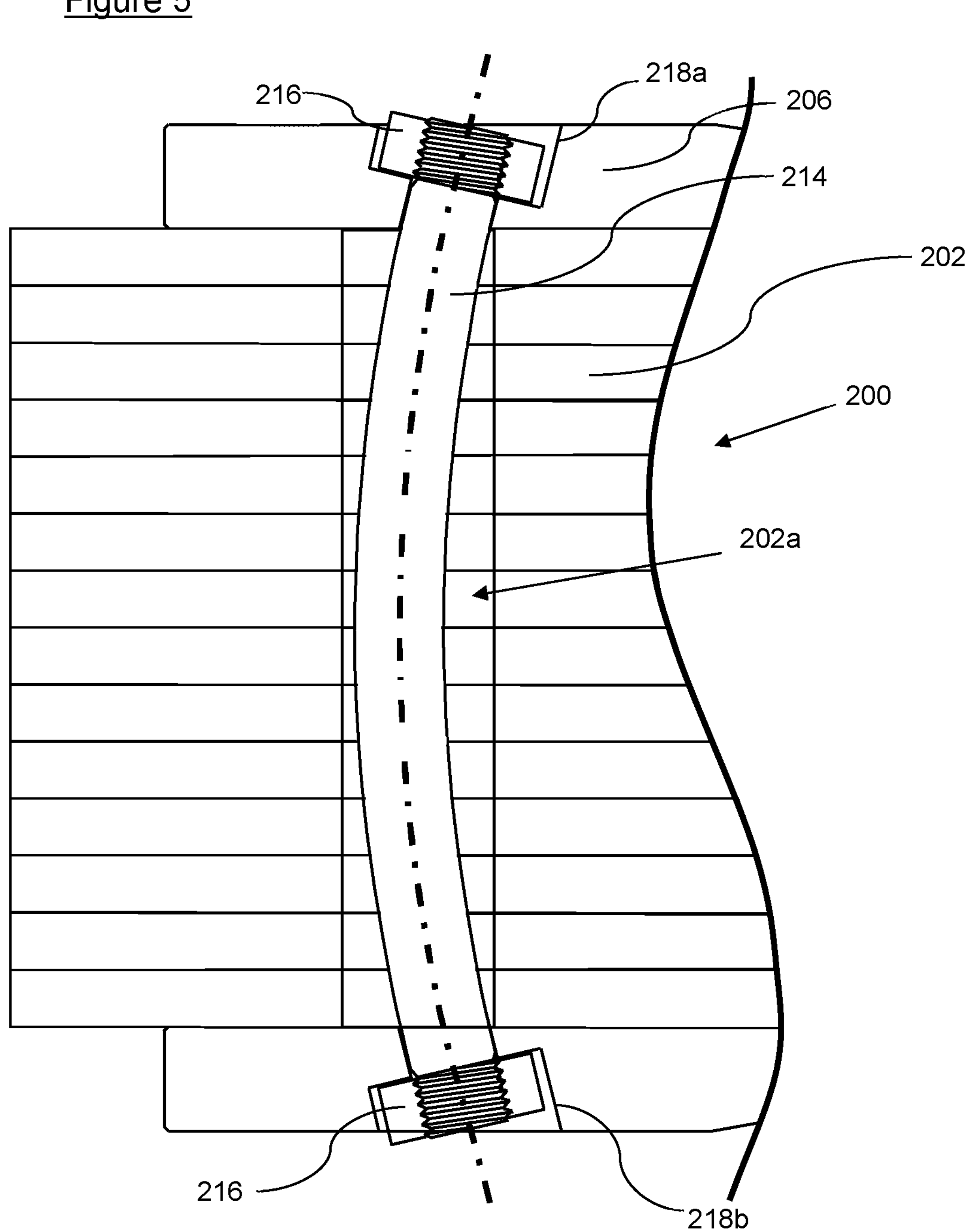
FIG. 5 shows a partial cross-sectional side view of a second embodiment of a flywheel, including a fifth version of connection means.

FIG. 5 depicts a fifth type of clamping element 214 (FIGS. 5 and 6) in a second embodiment of a flywheel, indicated generally at 200. The flywheel 200 is similar to the first flywheel 100 save for the different clamping elements and plate members.

The element 214 is a curved clamping element. Note that the sizes of the disc apertures 202*a* need to be correspondingly larger than for the linear elements to provide the gap between the clamping element 214 and the disc apertures 202*a*.

The element 214 is solid in this embodiment but could be hollow in other embodiments. The clamping element 214 follows a curved longitudinal axis. The curvature of the element 214 substantially approximates to a catenary (or part of a catenary). The element 214 can be pre-shaped accordingly prior to insertion into the stack.

The curved clamping element 214 is arranged with such that, in profile, its convex side is radially outside its concave side with respect to the flywheel axis A-A (refer to FIG. 3 for the position of the same axis in the flywheel 200).

Due to the curvature of the clamping element 214, the plate members in this embodiment include angled recesses 218*a*, 218*b* for the fixing means 216. The recesses are angled such that are each on an axis which is not perpendicular to a plane of each plate member 206. In this embodiment, the angle is around 15 degrees to an axis which is perpendicular to the plane of the plate member 206. The angle will vary depending on the height of the stack, the diameter of the clamping element 114 and size of the disc aperture openings, 202*a* but will typically be within 10-30 degrees.

The first recess 218*a* is angled in opposition to the second recess 218*b*. It will be appreciated that corresponding angled recesses are provided for each curved clamping element through the stack 204.

Figure 6:
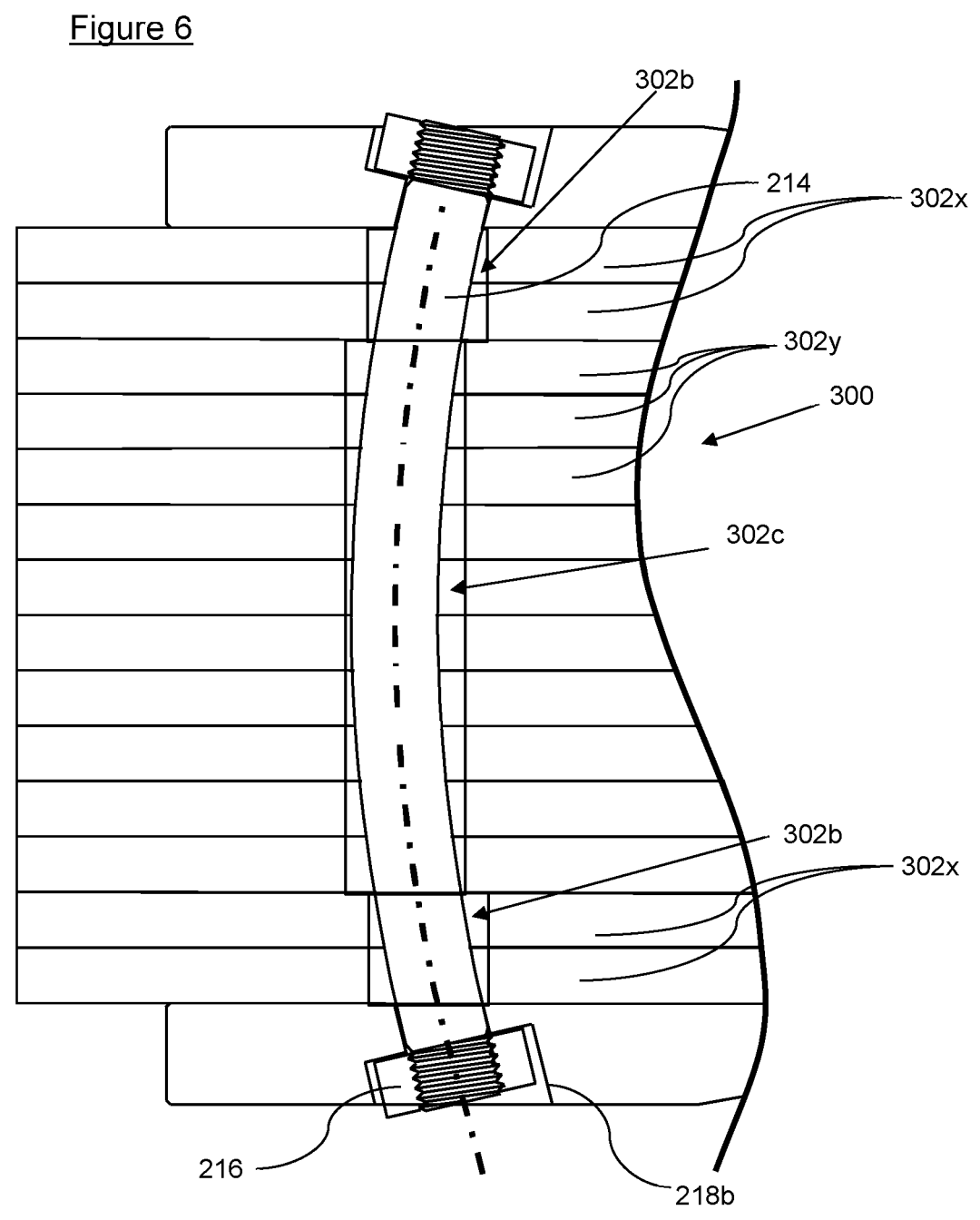

FIG. 6 depicts the same clamping element as FIG. 5, but provided in a third embodiment of a flywheel, indicated generally at 300. The flywheel 300 is similar to the second flywheel 200 save for differences in the discs.

In this embodiment, the stack of discs includes at least two different types or variations of discs 302. The first two discs 302*x* and the last two discs 302*x* in the stack are a first type of disc, and have a first set of disc apertures 302*b* co-aligned along a first axis. The discs 302*y* in the stack between the pairs of end discs 302*x* are a second type of disc, and have a second set of disc apertures 302*c* co-aligned along a second axis.

The second axis is disposed radially outwards of the first axis, relative to the flywheel axis A-A. The disc apertures 302*b*, 302*c* can thus be smaller in size than the disc apertures 202*a* in the FIG. 5 embodiment whilst still maintaining a gap between the element 214 and the disc apertures 302*b*, 302*c*.

It will be appreciated that the size and position of the disc apertures may be provided in any arrangement which accommodates the size and shape of the clamping element through the stack. Thus, three or more disc types may be provided, and in some embodiments it is envisaged that each disc could have its disc apertures slightly offset from those of its immediate neighbours to overall provide a stack aperture which most closely approximates the shape of the non-linear clamping element.

Figure 7:
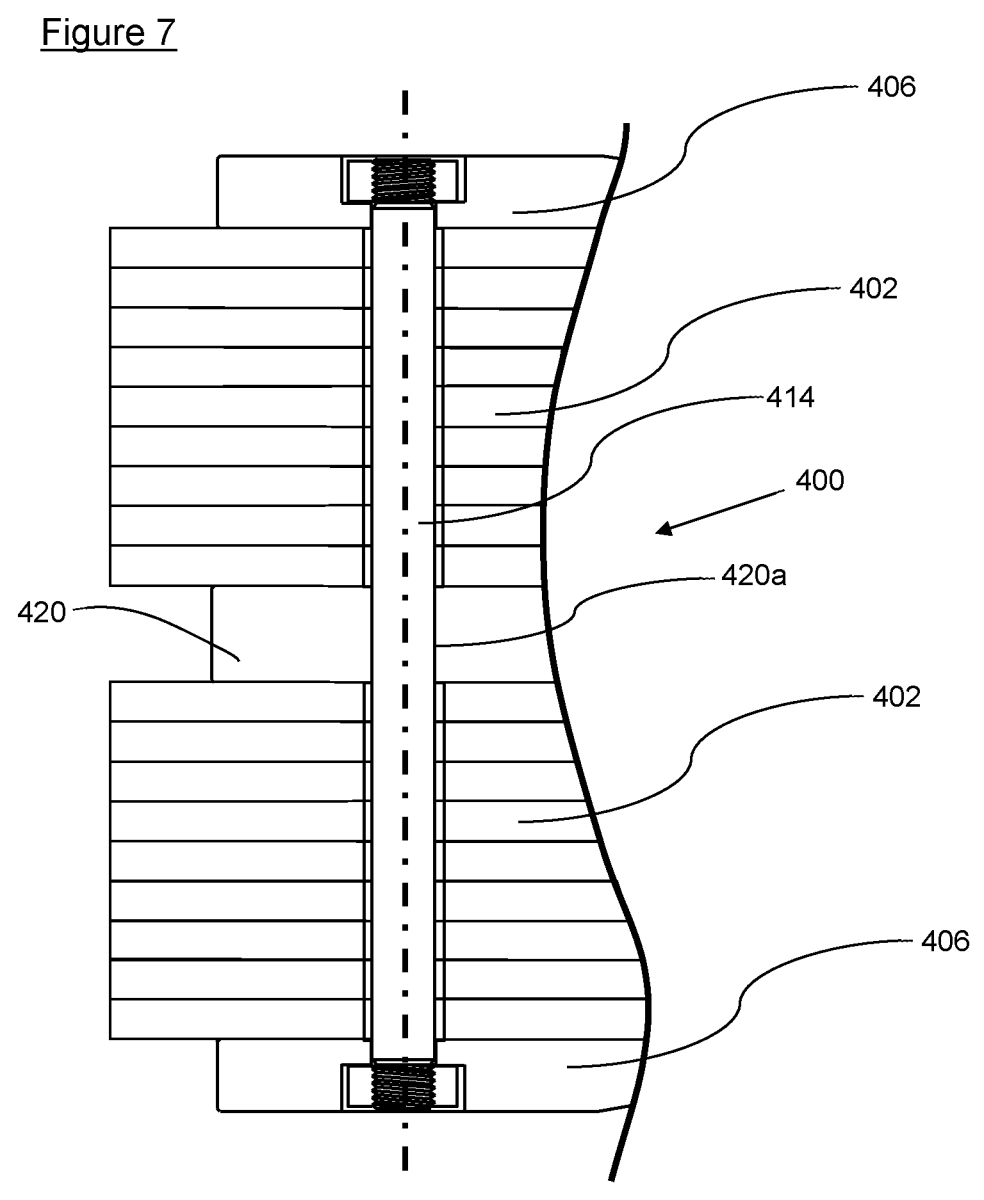

FIG. 7 relates to a fourth embodiment of flywheel, indicated generally at 400. The flywheel 400 is similar to the first flywheel 100 save for the different stack arrangement.

In some embodiments, the number of discs 402 provides a stack which is sufficiently long that the corresponding connection element(s) 414 could become too highly stressed during flywheel rotation. To mitigate this, an intermediate plate 420 is provided partway through the stack 404 to support the connection element 414 within the body of the stack. In this embodiment, there are eighteen discs 402 which are split into first and second groups of nine discs on either side of the intermediate plate.

The intermediate plate has plate apertures 420*a* which substantially correspond to the size and shape of the connection element 414 for supporting that element.

It will be appreciated that the intermediate plate 420 may be sized and/or shaped differently to the discs 402 and/or the plate members 406. For example, in some embodiments, the intermediate plate may include recessed regions on its surfaces for minimising contact area with and stresses on the adjacent discs 402. The intermediate plate recessed regions may be concave and/or annular, similarly to the end plate recessed regions.

It will also be appreciated that the intermediate plate may be used in conjunction with any of the types of connecting element discussed herein, where the intermediate plate apertures and connecting elements are suitably configured.

Figure 8:
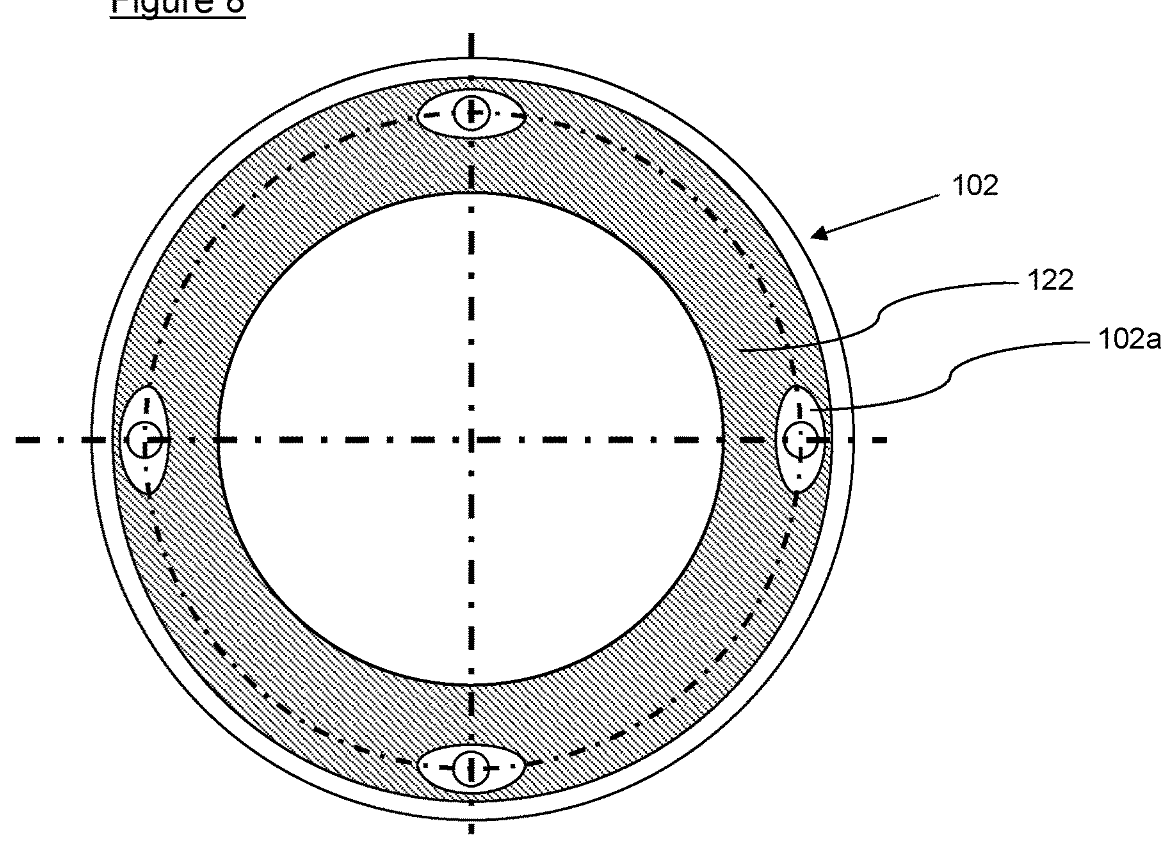
FIG. 8 shows a top view of a disc for any of the flywheels of FIGS. 3, 5, 6 and 7, including a first embodiment of a surface layer applied to the disc.
Figure 9:
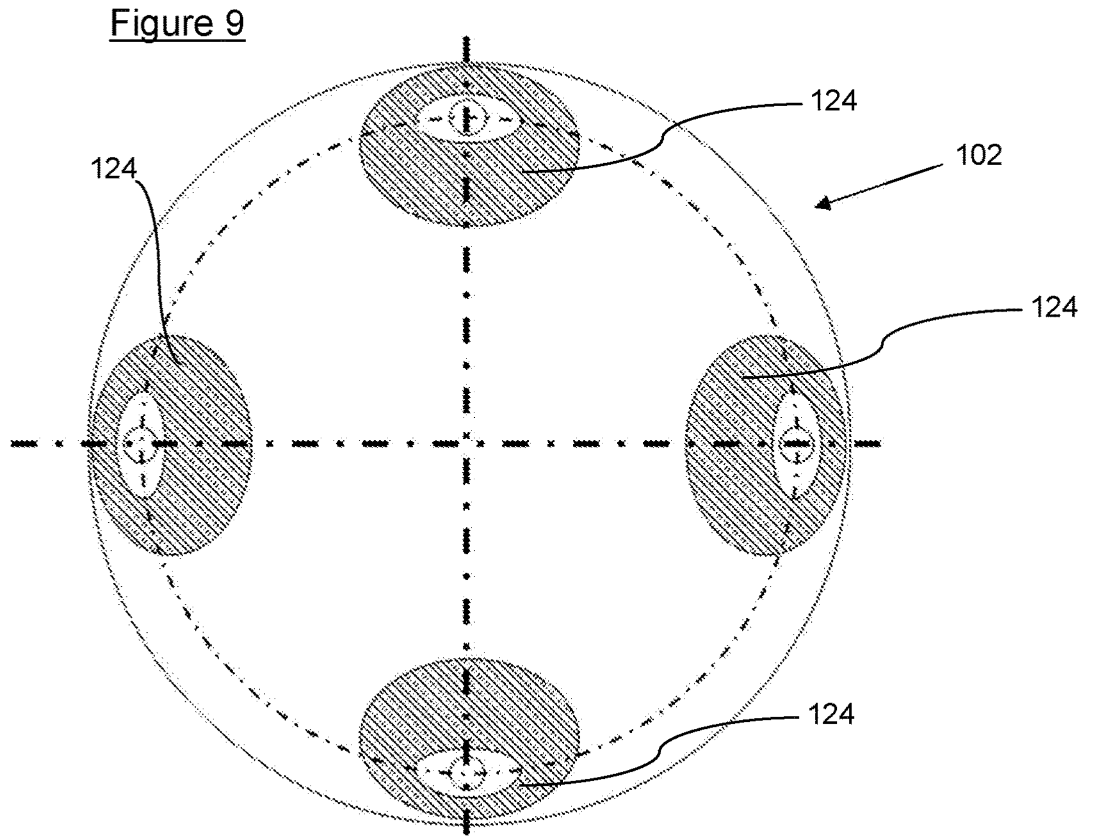
FIG. 9 shows a top view of a disc for any of the flywheels of FIGS. 3, 5, 6 and 7, including a second embodiment of a surface layer applied to the disc.

FIGS. 8 and 9 relate to a material which is provided as a layer or layers between given pairs of adjacent discs. For brevity, the reference numerals used will refer to the first embodiment of the flywheel 100, but the material layer(s) may be provided in any embodiments of the invention, between some or all of the adjacent pairs of discs in the stack.

In FIG. 8, a partial surface layer 122 is provided on a peripheral annular surface region of the disc 102, passing around the apertures 102*a*. In FIG. 9, a plurality of partial surface layers 124 are provided, each layer 124 being arranged around one of the apertures 102*a* in an approximately elliptical or oval shape (although layers with circular perimeters or other shapes of perimeter may be provided in other embodiments).

The or each layer helps to minimise or substantially prevent rotation of one disc relative to its neighbouring discs by increasing friction and reducing the likelihood of slippage. This is in addition to the clamping force provided by the plate members 106 which also mitigates slippage.

The or each layer can be made of thermoplastic, or a thermosetting plastic, or a soft metal or alloy such as solder. The plastic/metal is applied as a thin layer or film on one or both sides of the disc in the shaded region indicated in FIG. 8 or the regions indicated in FIG. 9.

Figures 10, 10A:
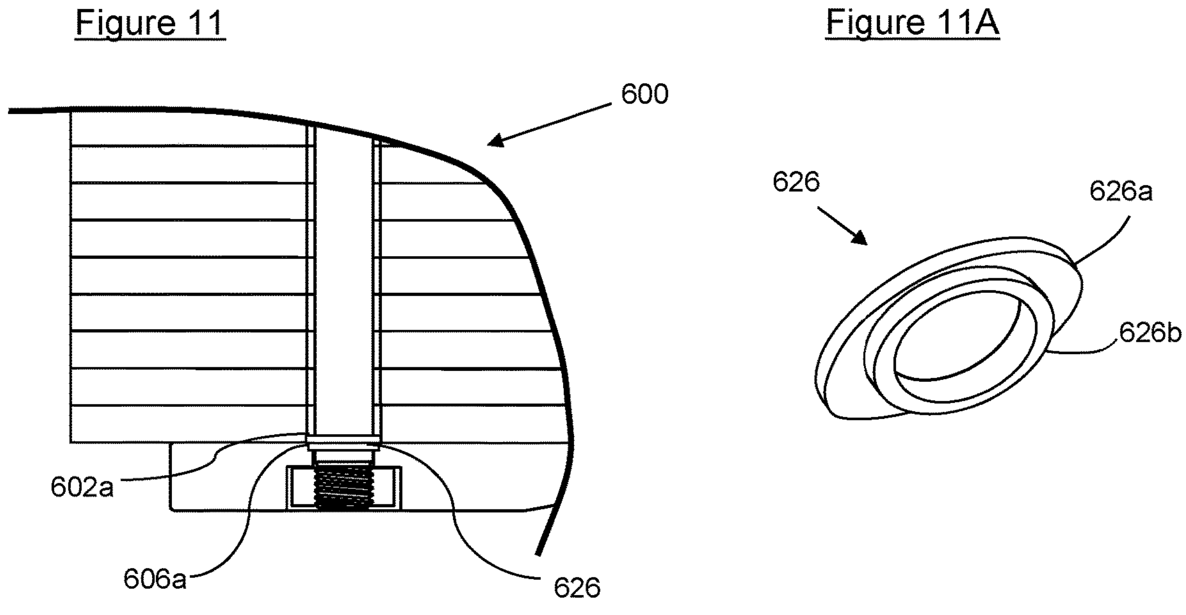
FIG. 10 shows a partial cross-sectional side view of a fifth embodiment of a flywheel.
FIG. 10A shows a perspective view of a first version of a locating means for the flywheel of FIG. 10.

FIGS. 10 and 10A relate to a fifth embodiment of a flywheel, indicated generally at 500. The main difference to the first flywheel 100 is the provision of a pocket or recess at each plate aperture 506*a*. Each pocket is provided on the stack-facing side of the plate member 506.

A plurality of spacers 526 are provided for fitting into some or all of the pockets at either end of the stack. The spacers 526 are locating means for locating the ends of the stack of discs 502 to the plate members 506 to prevent relative movement of those parts. A hole 528 is provided through the middle of each spacer for receiving a given connection element.

The size and shape of each spacer 526 is configured to snugly fit each pocket and also snugly fit into each end disc aperture. The spacer 526 of FIG. 10A has a substantially elliptical sidewall in this embodiment.

FIGS. 11 and 11A relate to a sixth embodiment of a flywheel, indicated generally at 600. This embodiment is similar to the fifth flywheel 500 and its apertured spacer 526. However, each spacer 626 in this embodiment is provided with an elliptical sidewall 626*a* in a first half for fitting an end disc aperture 602*a*, and with a circular sidewall 626*b* in a second half for fitting a corresponding round pocket at the plate aperture 606*a*.

Figures 12, 12A:
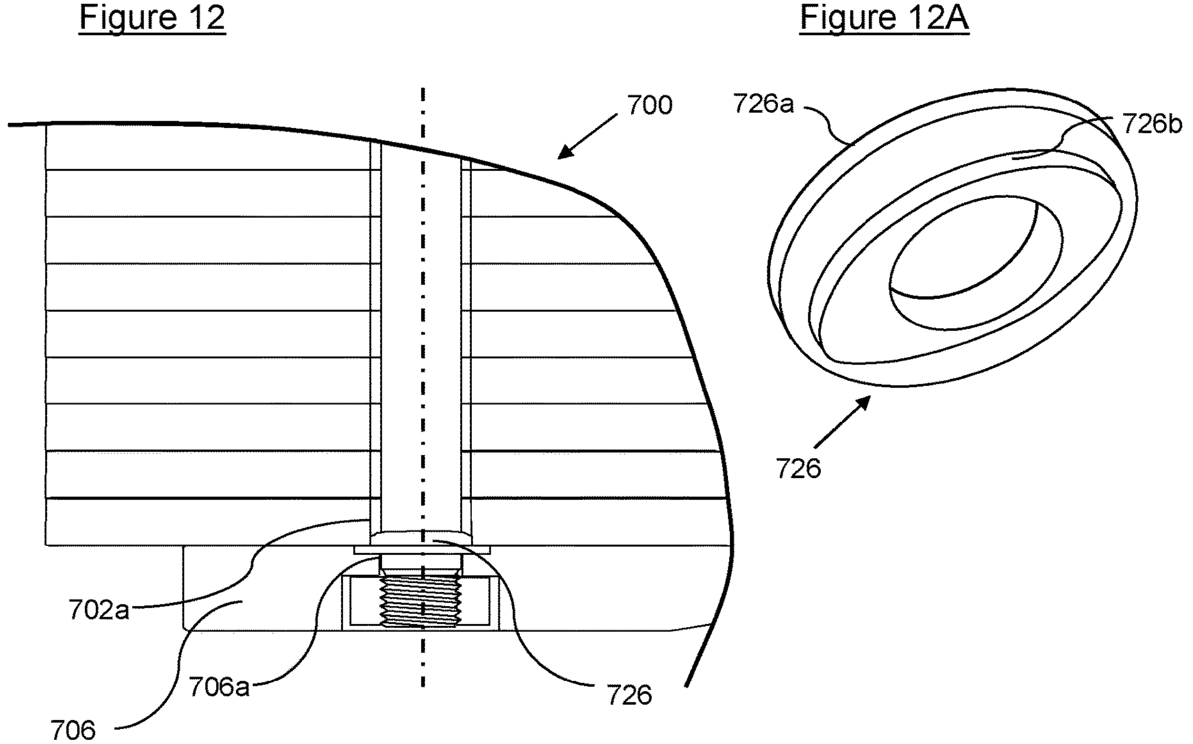
FIG. 12 shows a partial cross-sectional side view of a seventh embodiment of a flywheel.
FIG. 12A shows a perspective view of a third version of a locating means for the flywheel of FIG. 12.

FIGS. 12 and 12A relate to a seventh embodiment of a flywheel, indicated generally at 700. This embodiment is similar to the fifth flywheel 500 and its apertured spacer 526. However, each spacer 726 in this embodiment is provided with a circular sidewall 726*a* (akin to a washer) in a first half for fitting a corresponding pocket at the plate aperture 706*a*, and with an elliptical sidewall 726*b* in a second half.

The elliptical sidewall 726*b* is larger in diameter than the corresponding end disc aperture. However, the spacer is formed of (or machined from) a malleable material and the action of clamping the plate members 706 together about the stack causes the spacer 726 to change shape to conform to the end disc aperture 702*a* and/or plate aperture 706*a*.

Note that the spacers 526, 626 of FIGS. 10A and 11A may also be formed or machined from any suitable material, which may include a malleable material.

FIGS. 13 and 13A relate to an eighth embodiment of a flywheel, indicated generally at 800. The main difference to the first flywheel 100 is in the shape of the plate members 806. Each plate member 806 includes a peripheral lip 828. The lip 828 may be considered to be an alternative or additional locating means to the spacers discussed above, for locating the stack to the plate members.

The lip 828 is circular and sized to correspond to the exterior sidewall of the end disc 802. In this case, the lip 828 has a substantially U-shaped cross-section at the disc-engaging portion. In some embodiments, each lip 828 can be a precision fit to its corresponding end disc 802.

FIGS. 14 and 14A relate to a ninth embodiment of a flywheel, indicated generally at 900. This embodiment is similar to the eighth flywheel 800. However, instead of having a continuous circular lip, each plate member 906 includes another engagement means for the end disc edge. In this case, a plurality of arms or lip members 928 is provided.

The four lip members 928 in this embodiment (three of which are visible) are equally spaced around the plate member 906. The lip members 928 may be integrally formed with the plate 906. In some embodiments, the lip members 928 are sized to provide a precision fit about the corresponding end disc 902.

Note that the shape of the plate members illustrated in FIGS. 13 to 14A as a simple disc is for illustration purposes only and is not to be construed as limiting or indicative of the shape or structure of the plate members in any flywheel embodiment.

It will be appreciated that the various versions of clamping elements, discs, plate members, spacers and material layers/films discussed for FIGS. 4 to 14A may be provided in any possible combination with the flywheel 100 of FIGS. 3 and 3A.

FIGS. 15A and 15B relate to a tenth embodiment of a flywheel, indicated generally at 1000. The flywheel 1000 in this embodiment has some similarities to the flywheel 100 described earlier, but is substantially different in that the connection means involves disc-to-disc bonding instead of clamping.

The flywheel 1000 includes a plurality of discs 1002 in a stack 1004. Each disc 1002 is substantially the same size and shape, and aligned along a common axis B-B of the flywheel 1000. Each disc 1002 is bonded to each of its neighbouring discs. None of the discs 1002 necessarily requires any disc apertures because the stack does not need to accommodate any connecting elements extending between the plate members.

Plate members or cheek plates 1006 are provided at either end of the stack 1004. The plate members 1006 are bonded to the ends of the stack 1004. The plate members 1006 may not include a recessed stack-facing portion, unlike the plate members in FIG. 3, for example.

In this embodiment, the plate members 1006 are substantially the same diameter as the discs 1002. Each plate member 1006 is thicker than one of the discs 1002. An outer surface of each plate member 1006 lies approximately parallel to the plane of the neighbouring disc, moving from a radial edge of the plate member 1006 towards the axis B-B to a position approximately at a quarter of the plate member radius. The plate member 1006 thickness then gradually increases moving further towards the axis B-B.

The plate members 1006 allow the laminate stack 1004 to be connected to bearing landings 1050. The cheek plates 1006 also allow the stack 1004 to be connected to be fitted together with an electrical machine rotor part 1060.

The disc-to-disc and disc-to-plate bonds should be made using a bonding material or means which is strong enough to maintain structural integrity of the flywheel 1000 during high-speed rotation. Epoxy resin, with or without toughening additives, is one such example, but should in no way be construed as the only possible bonding means. It is contemplated that other suitable resins, glues or adhesives may be used. Bonding may be achieved in some cases by soldering, brazing or other processing techniques to provide bonded interfaces between adjacent discs, for example.

The disc-to-disc bonding is provided by a bonding area 1030 near or at the outer portion of each disc 1002. That is, at a peripheral region 1032 of each disc 1002. Central regions 1034 (or regions within each peripheral region 1032) of each disc are not bonded together. This means that only part of the surface of each disc 1002 is bonded to its neighbouring discs 1002 (or neighbouring disc and neighbouring plate member) in the stack 1004.

Considering disc thickness in a direction parallel to the flywheel axis B-B, the peripheral region 1032 of each disc 1002 is marginally thicker than the central region 1034 of that disc 1002. The difference in thickness is exaggerated in FIGS. 15B and 15C solely for the purpose of illustration. It will be appreciated that the difference in thickness may be on the order of microns or tens of microns, as long as a sufficient space is provided between adjacent central regions 1034 to provide them substantially out of direct contact with each other.

The peripheral region 1032 of each disc 1002 includes a raised landing (or landing feature) 1032*a* on each end face, which provides the annular bonding area 1030. It will be appreciated that, in some embodiments, the landings may only be provided on one end face of each disc.

Each landing 1032*a* is substantially annular in shape when considering the stack from an end-on view, along the flywheel axis B-B.

Each landing 1032*a* is bonded to a corresponding substantially planar surface or landing 1032*a* in the peripheral region of a neighbouring disc 1002. The thickness of the bonding is exaggerated in FIGS. 15B and 15C solely for the purpose of illustration.

A peripheral region of a disc-facing side of each plate member 1006 includes a substantially planar surface or landing 1006*b*. Each landing 1006*b* is bonded to the corresponding outer landing 1032*a* of the respective end disc of the stack 1004. A central region of the plate member 1006 is spaced from the central region 1034 of the end disc 1002.

The landings 1032*a*, 1006*b* on the discs and plate members can be formed by stamping or forging the discs 1002 and plate members 1006.

FIG. 15C relates to a variant of the flywheel 1000 in FIGS. 15A and 15B. In this case, the discs 1002 have substantially the same thickness across their full diameter. That is, they do not have raised peripheral landings. The plate members 1006 also do not have raised landings.

In this case, a shim or plurality of shims 1036 are provided between adjacent discs 1002, and between each end disc 1002 and the adjacent plate member 1006. The shim 1036 is annular in shape, or if multiple shim pieces 1036 are provided between each pair of adjacent discs then shims are arranged annularly between the discs.

The shim(s) can be made of metal or any other suitable material, such as a material impregnated with an adhesive, for example. The shim may in some embodiments be made from a bonding agent, such as solder, which is applied over a substantially annular area on the disc(s) 1002 and/or plate member 1006 being bonded.

The shim(s) are thin enough to provide a small gap or space between opposing central regions of neighbouring discs 1002, to keep the central regions substantially out of contact. The shims at the ends of the stack 1004 similarly provide a small gap or space between the outward-facing central region of each end disc 1002 and the stack-facing central region of the plate member 1006, to keep the central regions substantially out of contact. The thickness of the shims is exaggerated in FIG. 15C solely for the purpose of illustration.

It will be appreciated that some contact may be provided between neighbouring central regions, but the present invention aims to minimise the extent of disc-to-disc contact, such that contact is mainly at the periphery of each disc.

Each shim or set of shim(s) 1036 is bonded to opposing peripheral regions of an adjacent pair of discs 1002. That is, bonding areas 1030 are provided on either side of the shim(s) to provide shim-to-disc bonds. A first face of the shim is bonded to a first peripheral region of a first disc. A second opposing face of the shim is bonded to a second peripheral region of a second disc. The bonding means/material is similar to that of FIG. 15B, but may be tailored according to the shim material to maximise bond strength.

Similarly, a shim or shims 1036 are bonded to opposing peripheral regions of each end disc 1002 and its adjacent plate member 1006. A first face of the or each shim is bonded to an outer peripheral region at the end of the stack 1004. A second opposing face of the shim is bonded to the stack-facing peripheral region of the plate member 1006.

It will be appreciated that both bonding means described in relation to FIGS. 15B and 15C may be provided in a given flywheel, if required.

FIG. 16 relates to an eleventh embodiment of a flywheel, indicated generally at 1100. The flywheel 1100 in this embodiment has similar features to the flywheel 100 described earlier for the first embodiment, but is substantially different in that the connection means is provided in contact (particularly indirect contact) with some or all of the disc apertures 1102.

It will be appreciated that the various versions of clamping elements, discs, plate members, spacers and material layers/films discussed for FIGS. 4 to 14A may be provided in the flywheel 1100 to the extent that the selected features do not conflict with the following.

A number of supports or space-filling elements 1138 are provided for each supporting one of the clamping elements 1114 within the stack 1104. The support 1138 may be considered to be a sheath or sleeve for snugly fitting around the clamping element 1114 and for snugly fitting to the interior of a series of the disc apertures 1102.

Each plate member 1106 has a recess 1106*c* around each of its plate apertures 1106*a*. Each recess 1106*c* is configured to engage an end of one of the supports 1138.

Figures 16A, 16B, 17, 17A:
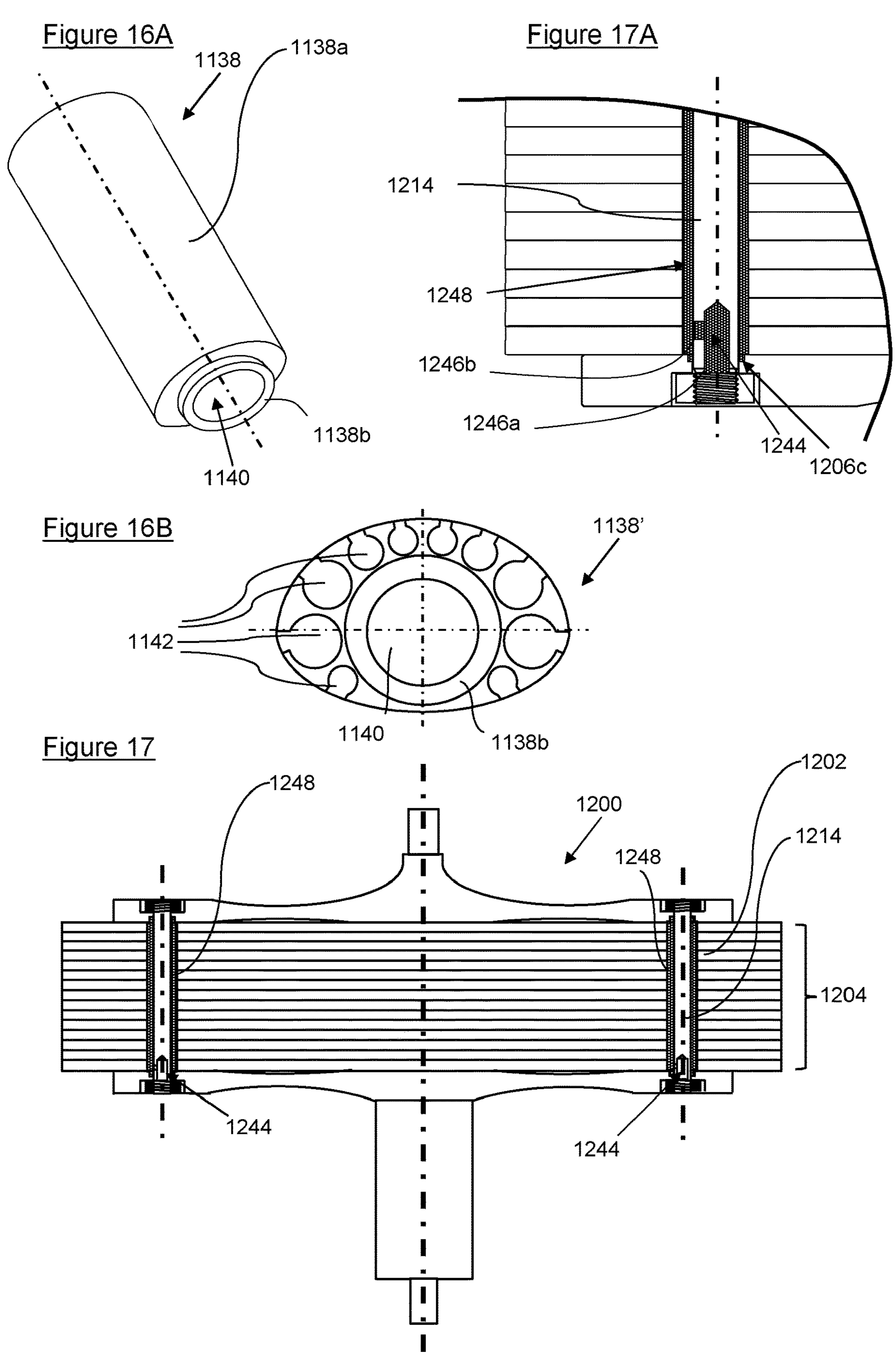
FIG. 16A shows a perspective view of a first embodiment of a spacer for connection means of the flywheel of FIG. 16.
FIG. 16B shows an end view of a second embodiment of a spacer for the connection means of the flywheel of FIG. 16.
FIG. 17 shows a cross-sectional side view of a twelfth embodiment of a flywheel.
FIG. 17A shows an enlarged partial cross-sectional side view of the flywheel of FIG. 17.

FIG. 16A shows the elongate sleeve 1138. End walls 1138*b* of the sleeve 1138 extend through the stack and into the respective recesses 1106*c* in the plate members 1106 in FIG. 16. The sleeve 1138 has an external sidewall profile 1138*a* which is substantially elliptical to match the substantially elliptical internal sidewall profile of each disc aperture in the stack 1104. The sleeve 1138 is rigid in this embodiment. A bore 1140 is provided through the middle of the support 1138 for receiving and supporting the clamping element.

It will be appreciated that the support 1138 may be considered to be an elongate, double-ended version of the spacer of FIG. 11A, but designed to fit to all of the disc apertures and along the length of the clamping element.

FIG. 16B depicts an end-on view of a variant of the support 1138'. In this case, a series of elongate channels 1142 are provided along some or all of length of the support 1138'. The channels allow the support 1138' to be substantially flexible along some or all of its length, and minimise its mass.

The channels 1142 are provided around the periphery of the sleeve 1138'. The channels do not intersect the bore 1140 which receives the clamping element. The channels 1142 can be formed by extruding the sleeve 1138', for example.

The channels 1142 are of different sizes. Each channel 1142 has an approximately cylindrical bore. The diameter of that bore is selected such that the circumference of the bore does not quite extend into the region behind the end wall 1138*b*, as viewed in FIG. 16B. The size of the bores may be altered in other embodiments to selectively control the rigidity or flexibility of the support sleeve 1138'.

It will be appreciated that a plurality of cavities may be provided within the body of the support 1138, 1138' to achieve a similar effect in other embodiments. The arrangement of the channels/cavities is not limited to the arrangement depicted in FIG. 16B, and any suitable arrangement may be provided.

FIGS. 17 and 17A relate to a twelfth embodiment of a flywheel, indicated generally at 1200. The flywheel 1200 in this embodiment is similar to the flywheel 100, but is substantially different in that the connection means is provided in contact (particularly indirect contact) with some or all of the disc apertures 1202.

However, unlike the eleventh flywheel 1100, this flywheel 1200 does not include a sleeve in the space between the connection elements and the disc apertures. A different support means is provided for the connection elements.

Each clamping element 1214 includes a conduit 1244. Each conduit includes an axial inlet 1246*a* through an end of the clamping element 1214, and a radial outlet 1246*b* (or in some embodiments multiple radial outlets) at the sidewall of the clamping element 1214. The outlet 1246*b* is inset from the inner end (i.e. the pointed end in FIG. 17A) of the conduit 1244.

The conduit(s) 1244 permit a fluid material 1248 to be introduced, e.g. injected under pressure, through each clamping element to flow into the space around the clamping element 1214. The fluid material can flow into recesses 1206*c* at the plate apertures 1206*a* as well as between the disc apertures 1002*a* and the clamping element 1214. In this respect, the fluid material may be introduced after the flywheel 1200 has been assembled.

In some embodiments, the fluid material may be molten and cool to form a solid support or spacer around part or all of the clamping element. In other embodiments, the fluid material may set/cure to form a similar form of solid support. The material solidifies to provide support extending along the stack, extending into the plate members.

The material may be a thermoplastic or thermosetting plastic (optionally including a strengthening filler in the flow). The material may be a low melting point metal or alloy, such as solder. Ideally, the melting point of the material should be below 600° C.

The embodiments described above are provided by way of example only, and various changes and modifications will be apparent to persons skilled in the art without departing from the scope of the present invention as defined by the appended claims.

The invention claimed is:

1. A flywheel comprising a plurality of discs arranged in a stack, including at least first and second end discs at either end of the stack, each of the plurality of discs including a plurality of disc apertures therethrough, first and second plate members disposed at opposing ends of the stack, one or both of the first and second plate members including a plurality of plate apertures therethrough for alignment with a corresponding series of disc apertures through the stack, in which one or both of the plate members includes one or more recesses which are disposed on a disc-facing side thereof and the one or more recesses include a disc-facing surface positioned adjacent to one or more of the plurality of plate apertures, and connection means for clamping the first and second plate members together about the stack of discs, the connection means extending through each of the plurality of disc apertures, in which a spacer or space-filling means is provided along a length of the or each connection means within the stack between the or each connection means and the respective series of disc apertures for supporting an external sidewall of the connection means, the spacer or space-filling means extending from a position within the stack into the one or more recesses of at least one of the plate members; and at least one of:

the spacer or space-filling means is in the form of a sleeve having a bore fitted around the connection means, in which the sleeve has a substantially elliptical external sidewall profile which substantially matches an elliptical internal sidewall profile of each disc aperture in a series of aligned disc apertures in the stack for snugly fitting therein, the sleeve extending into the one or more recesses of one or both of the plate members; or the spacer or space-filling means comprises a set material, and the connection means includes a conduit for conveying a material flow, for forming the set material, into the one or more recesses and space between the connection means and the disc apertures.

2. A flywheel as claimed in claim 1, in which the sleeve is rigid.

3. A flywheel as claimed in claim 1, in which the sleeve is flexible and includes one or more cavities or channels disposed around a periphery of the sleeve between the bore and an external sidewall of the sleeve.

4. A flywheel as claimed in claim 1, in which the set material includes at least one of: a thermoplastic material, with or without a strengthening filler; a thermoset plastic material, with or without a strengthening filler; and a low melting point metal.

5. A flywheel as claimed in claim 1, in which the connection means includes one or more bolts or threaded studs including a sidewall with an outer surface, and in which each bolt or threaded stud is hollow.

6. A flywheel as claimed in claim 1, in which one or both of the first and second plate members includes a circumferential lip or a plurality of lip members configured to fit around the periphery of one or both of the first and second end discs respectively.

7. A flywheel assembly comprising one or more flywheels as claimed in claim 1, the or each flywheel being mounted on or to a drive assembly for facilitating rotation of the or each flywheel for storing energy in or deploying energy from at least one of the flywheels.

8. A flywheel as claimed in claim 1, in which the connection means extends through each of the plurality of disc apertures without contacting the plurality of discs.

9. A flywheel as claimed in claim 1, in which the set material extends through the stack into the one or more recesses of both of the plate members.

10. A flywheel as claimed in claim 1, in which at least one of the plurality of the plate apertures has a minimum width at a first position in one or both of the first and second plate members, at least one of the one or more recesses is disposed at a second position in the one or both of the first and second plate members, wherein the second position is adjacent to the first position, and wherein the second position is closer to the stack of discs than the first position.

11. A flywheel comprising a plurality of discs arranged in a stack, including at least first and second end discs at either end of the stack, each of the plurality of discs including a plurality of disc apertures therethrough, first and second plate members disposed at opposing ends of the stack, one or both of the first and second plate members including a plurality of plate apertures therethrough for alignment with a corresponding series of disc apertures through the stack, in which one or both of the plate members includes one or more recesses which are disposed on a disc-facing side thereof and positioned adjacent to one or more of the plurality of plate apertures, and connection means for clamping the first and second plate members together about the stack of discs, the connection means extending through each of the plurality of disc apertures, in which a spacer or space-filling means is provided between the or each connection means and the respective disc apertures for supporting the connection means, the spacer or space-filling means extending from a position within the stack into the one or more recesses of at least one of the plate members, in which:

a minimum width of each plate aperture is less than a width of each disc aperture, or at least some of the disc apertures are provided in a linear series, the or each plate aperture meets a respective end of the linear series, and the disc apertures in the linear series are wider than the or each plate aperture where the or each plate aperture meets the respective end of the linear series.

12. A flywheel as claimed in claim 11, in which one or both of the first plate member and the second plate member include: one or more clamping areas in abutment with the respective end disc to clamp about a peripheral or outer region of the disc stack, and at least one recessed area which faces towards and is spaced apart from the respective end disc.

13. A flywheel as claimed in claim 12, in which the at least one recessed area is closer to the stack centre than the one or more clamping areas.

14. A flywheel as claimed in claim 12, in which the at least one recessed area is concave and/or annular in shape.

15. A flywheel as claimed in claim 11, in which the connection means includes one or more bolts or threaded studs including a sidewall with an outer surface, and in which each bolt or threaded stud is hollow.

16. A flywheel comprising, a plurality of discs arranged in a stack, including at least first and second end discs at either end of the stack, each of the plurality of discs including a plurality of disc apertures therethrough, first and second plate members disposed at opposing ends of the stack, one or both of the first and second plate members including a plurality of plate apertures therethrough for alignment with a corresponding series of disc apertures through the stack, in which one or both of the plate members includes one or more recesses which are disposed on a disc-facing side thereof and the one or more recesses include a disc-facing surface positioned adjacent to one or more of the plurality of plate apertures, and connection means for clamping the first and second plate members together about the stack of discs, the connection means extending through each of the plurality of disc apertures, in which a spacer or space-filling means is provided along a length of the or each connection means within the stack between the or each connection means and the respective series of disc apertures for supporting an external sidewall of the connection means, the spacer or space-filling means extending from a position within the stack into the one or more recesses of at least one of the plate members, in which the spacer or space-filling means is in the form of a sleeve having a bore fitted around the connection means, and in which the sleeve extends through the stack into the one or more recesses of both of the plate members.

17. A flywheel as claimed in claim 12, in which one or both of the first plate member and the second plate member include one or more additional regions which engage or abut the respective end disc in a central region thereof, inset from the at least one recessed area.

* * * * *